US009472054B2

(12) United States Patent
Caputo et al.

(10) Patent No.: US 9,472,054 B2
(45) Date of Patent: Oct. 18, 2016

(54) GAMING SYSTEM AND METHOD PROVIDING A SELECTION GAME INCLUDING A FIRST SET OF SELECTIONS ASSOCIATED WITH ACTIVATABLE SELECTION GAME ENHANCEMENTS AND A SECOND SET OF SELECTIONS ASSOCIATED WITH AWARDS

(71) Applicant: IGT, Las Vegas, NV (US)

(72) Inventors: Scott A. Caputo, Santa Clara, CA (US); Brian F. Saunders, Sunnyvale, CA (US)

(73) Assignee: IGT, Las Vegas, NV (US)

( * ) Notice: Subject to any disclaimer, the term of this patent is extended or adjusted under 35 U.S.C. 154(b) by 0 days.

(21) Appl. No.: 14/721,710

(22) Filed: May 26, 2015

(65) Prior Publication Data
US 2015/0356829 A1 Dec. 10, 2015

Related U.S. Application Data

(60) Provisional application No. 62/007,575, filed on Jun. 4, 2014.

(51) Int. Cl.
| | |
|---|---|
| *A63F 9/24* | (2006.01) |
| *A63F 13/00* | (2014.01) |
| *G06F 17/00* | (2006.01) |
| *G06F 19/00* | (2011.01) |
| *G07F 17/32* | (2006.01) |
| *A63F 13/77* | (2014.01) |
| *A63F 13/30* | (2014.01) |

(52) U.S. Cl.
CPC .......... *G07F 17/3262* (2013.01); *A63F 13/30* (2014.09); *A63F 13/77* (2014.09); *G07F 17/3227* (2013.01)

(58) Field of Classification Search
USPC ........................ 463/7, 10, 17, 19, 20, 22, 25
See application file for complete search history.

(56) References Cited

U.S. PATENT DOCUMENTS

| | | |
|---|---|---|
| 5,833,537 A | 11/1998 | Barrie |
| 6,174,235 B1 | 1/2001 | Walker et al. |
| 6,309,300 B1 | 10/2001 | Glavich |
| 6,315,664 B1 | 11/2001 | Baerlocher et al. |
| 6,319,124 B1 | 11/2001 | Baerlocher et al. |
| 6,364,767 B1 | 4/2002 | Brossard et al. |
| 6,439,995 B1 | 8/2002 | Hughs-Baird et al. |
| 6,450,883 B1 | 9/2002 | O'Halloran |
| 6,511,375 B1 | 1/2003 | Kaminkow |
| 6,514,141 B1 | 2/2003 | Kaminkow et al. |
| 6,561,899 B2 | 5/2003 | Vancura |

(Continued)

*Primary Examiner* — Adetokunbo O Torimiro
(74) *Attorney, Agent, or Firm* — Neal, Gerber & Eisenberg LLP

(57) ABSTRACT

Various embodiments of the present disclosure provide a gaming system and method providing a selection game including a first set of selections associated with a plurality of different activatable selection game enhancements and a different second set of selections associated with a plurality of different awards. Generally, for a play of the selection game, the gaming system enables a player to use a quantity of picks to pick one or more selections of the first set to cause the gaming system to activate certain of the selection game enhancements without providing awards and/or to pick one or more selections of the second set to cause the gaming system to provide certain of the awards. Each selection game enhancement, when active, causes the gaming system to modify at least one feature of the selection game to increase the value of the remainder of the play of the selection game.

23 Claims, 17 Drawing Sheets

(56) References Cited

U.S. PATENT DOCUMENTS

| | | |
|---|---|---|
| 6,569,015 B1 | 5/2003 | Baerlocher et al. |
| 6,582,307 B2 | 6/2003 | Webb |
| 6,592,457 B1 * | 7/2003 | Frohm et al. .................. 463/16 |
| 6,599,185 B1 | 7/2003 | Kaminkow et al. |
| 6,602,137 B2 | 8/2003 | Kaminkow et al. |
| 6,609,971 B2 | 8/2003 | Vancura |
| 6,676,516 B2 | 1/2004 | Baerlocher et al. |
| 6,688,975 B2 | 2/2004 | Baerlocher et al. |
| 6,722,983 B2 | 4/2004 | Kaminkow et al. |
| 6,726,563 B1 | 4/2004 | Baerlocher et al. |
| 6,733,386 B2 | 5/2004 | Cuddy et al. |
| 6,733,389 B2 | 5/2004 | Webb et al. |
| 6,769,983 B2 | 8/2004 | Slomiany |
| 6,780,107 B2 | 8/2004 | Baerlocher et al. |
| 6,783,457 B2 | 8/2004 | Hughs-Baird et al. |
| 6,796,899 B2 | 9/2004 | Baerlocher |
| 6,875,108 B1 | 4/2005 | Hughs-Baird |
| 6,877,745 B1 | 4/2005 | Walker et al. |
| 6,899,620 B2 | 5/2005 | Kaminkow et al. |
| 6,918,834 B2 | 7/2005 | Vancura |
| 6,929,545 B2 | 8/2005 | Vancura |
| 6,932,701 B2 | 8/2005 | Glavich et al. |
| 6,958,013 B2 | 10/2005 | Miereau et al. |
| 7,004,834 B2 | 2/2006 | Walker et al. |
| 7,037,191 B2 | 5/2006 | Rodgers et al. |
| 7,040,984 B2 | 5/2006 | Mead |
| 7,121,942 B2 | 10/2006 | Baerlocher |
| 7,172,506 B2 | 2/2007 | Baerlocher et al. |
| 7,235,011 B2 | 6/2007 | Randall et al. |
| 7,264,545 B2 | 9/2007 | Maya et al. |
| 7,273,415 B2 | 9/2007 | Cregan et al. |
| 7,300,348 B2 | 11/2007 | Kaminkow et al. |
| 7,314,409 B2 | 1/2008 | Maya et al. |
| 7,316,609 B2 | 1/2008 | Dunn et al. |
| 7,338,364 B2 | 3/2008 | Baerlocher et al. |
| 7,371,174 B2 | 5/2008 | Baerlocher |
| 7,377,849 B2 | 5/2008 | Baerlocher et al. |
| 7,413,510 B2 | 8/2008 | Schlegel et al. |
| 7,455,588 B2 | 11/2008 | Webb et al. |
| 7,544,129 B2 | 6/2009 | Baerlocher |
| 7,547,252 B2 | 6/2009 | Peterson et al. |
| 7,566,271 B2 | 7/2009 | Hostetler et al. |
| 7,585,218 B2 | 9/2009 | Mead et al. |
| 7,591,722 B2 | 9/2009 | Baerlocher et al. |
| 7,666,089 B2 | 2/2010 | Rodgers et al. |
| 7,674,180 B2 | 3/2010 | Graham et al. |
| 7,690,981 B2 | 4/2010 | Ching et al. |
| 7,749,070 B2 | 7/2010 | Baerlocher et al. |
| 7,771,266 B2 | 8/2010 | Gerrard et al. |
| 7,785,188 B2 | 8/2010 | Cannon |
| 7,789,755 B2 | 9/2010 | Davis et al. |
| 7,806,760 B2 | 10/2010 | Baerlocher |
| 7,862,430 B2 | 1/2011 | Baerlocher et al. |
| 7,867,074 B2 | 1/2011 | Gerrard et al. |
| 7,874,912 B2 | 1/2011 | Cregan et al. |
| 7,887,409 B2 | 2/2011 | Baerlocher et al. |
| 7,901,282 B2 | 3/2011 | Cannon |
| 7,914,373 B2 | 3/2011 | Webb et al. |
| 7,985,133 B2 | 7/2011 | Baerlocher et al. |
| 8,002,620 B2 | 8/2011 | Nicely et al. |
| 8,029,355 B2 | 10/2011 | Parente |
| 8,043,153 B2 | 10/2011 | Ross et al. |
| 8,079,903 B2 | 12/2011 | Nicely et al. |
| 8,092,302 B2 | 1/2012 | Cuddy et al. |
| 8,109,824 B2 | 2/2012 | Frank et al. |
| 8,118,662 B2 | 2/2012 | Caputo et al. |
| 8,133,105 B2 | 3/2012 | Walker et al. |
| 8,142,280 B2 | 3/2012 | Walker et al. |
| 8,152,630 B2 | 4/2012 | Cohen |
| 8,210,935 B2 | 7/2012 | Caputo et al. |
| 8,210,937 B2 | 7/2012 | Cregan et al. |
| 8,221,206 B2 | 7/2012 | Marks et al. |
| 8,262,455 B2 | 9/2012 | Caputo et al. |
| 8,287,364 B2 | 10/2012 | Caputo et al. |
| 8,376,836 B2 | 2/2013 | Baerlocher et al. |
| 8,382,572 B2 | 2/2013 | Hoffman et al. |
| 8,425,303 B2 | 4/2013 | Kennedy et al. |
| 8,460,090 B1 | 6/2013 | Gilliland |
| 8,672,762 B1 | 3/2014 | Basallo et al. |
| 8,678,908 B2 | 3/2014 | Nicely |
| 8,708,804 B2 | 4/2014 | Caputo et al. |
| 2004/0147306 A1 | 7/2004 | Randall et al. |
| 2005/0033461 A1 | 2/2005 | Gerrard et al. |
| 2005/0054413 A1 | 3/2005 | Randall et al. |
| 2005/0054435 A1 | 3/2005 | Rodgers et al. |
| 2005/0059455 A1 | 3/2005 | Gerrard et al. |
| 2006/0030401 A1 | 2/2006 | Mead et al. |
| 2006/0142077 A1 * | 6/2006 | Miles et al. .................. 463/20 |
| 2006/0229124 A1 * | 10/2006 | Walker et al. .................. 463/20 |
| 2008/0076542 A1 | 3/2008 | Iddings et al. |
| 2010/0081497 A1 | 4/2010 | Wolf et al. |
| 2010/0113122 A1 | 5/2010 | Walker et al. |
| 2010/0137056 A1 | 6/2010 | Hoffman et al. |
| 2011/0003627 A1 | 1/2011 | Nicely et al. |
| 2012/0214580 A1 | 8/2012 | Hoffman et al. |
| 2013/0079123 A1 | 3/2013 | Nicely et al. |
| 2013/0084961 A1 | 4/2013 | Radisich et al. |
| 2013/0084962 A1 | 4/2013 | Radisich et al. |
| 2013/0084994 A1 | 4/2013 | Farrar |
| 2013/0178260 A1 * | 7/2013 | Baerlocher et al. .............. 463/7 |
| 2013/0217476 A1 | 8/2013 | Frank et al. |
| 2013/0225268 A1 | 8/2013 | Caputo et al. |
| 2014/0018146 A1 | 1/2014 | Zielinski et al. |
| 2014/0087809 A1 | 3/2014 | Leupp et al. |
| 2014/0087855 A1 | 3/2014 | Caputo et al. |
| 2014/0329590 A1 | 11/2014 | Caputo et al. |

* cited by examiner

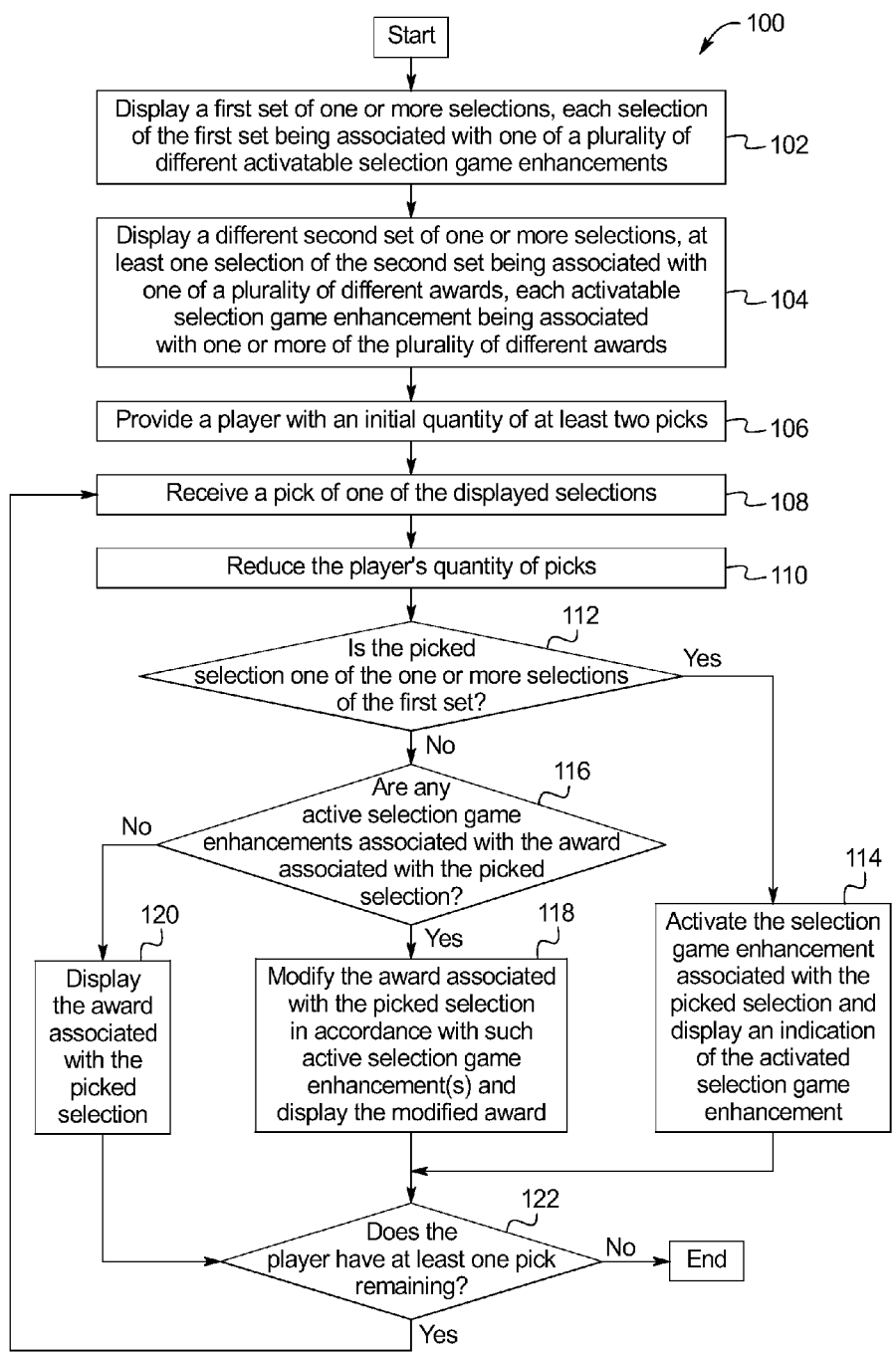

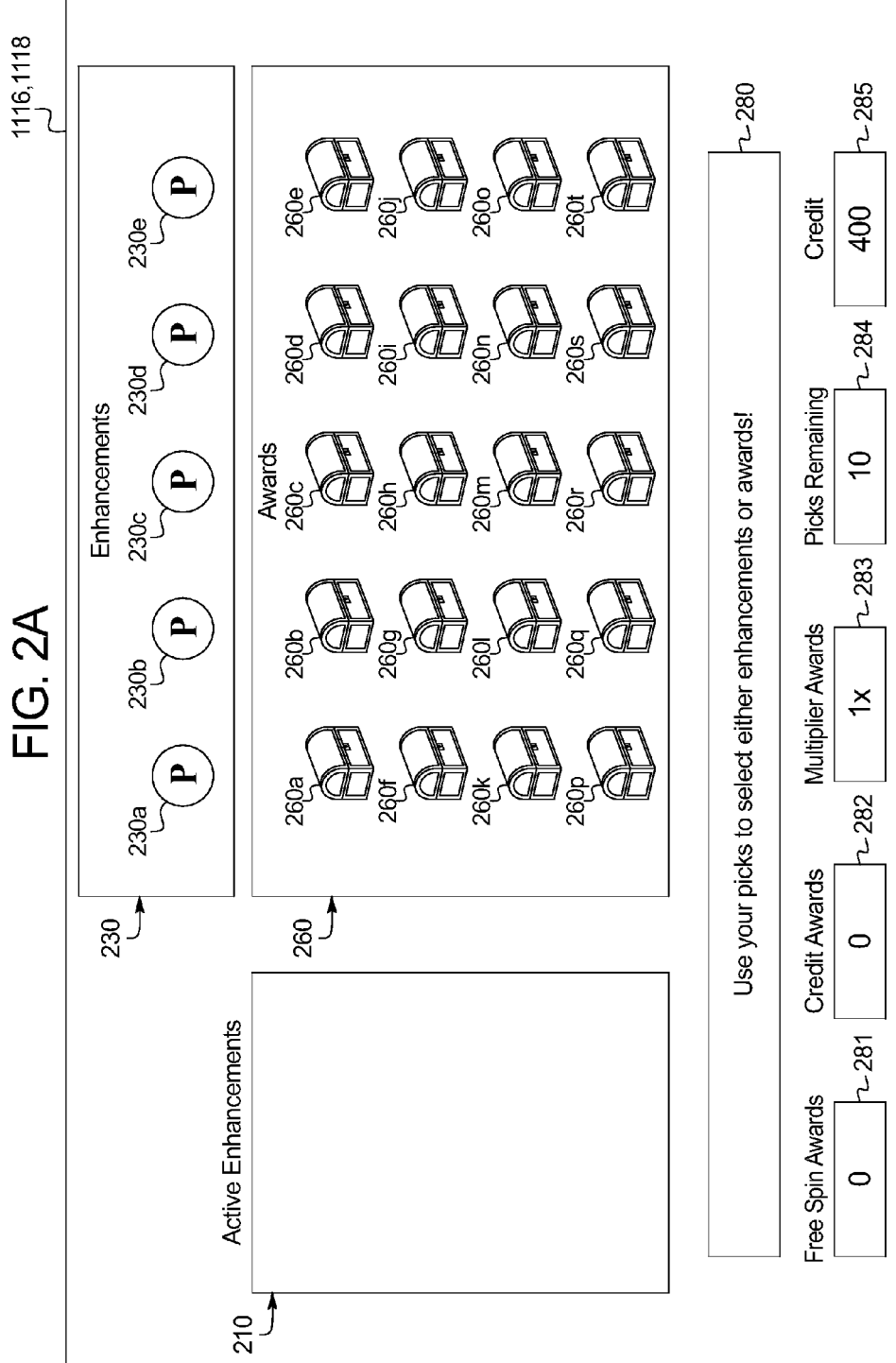

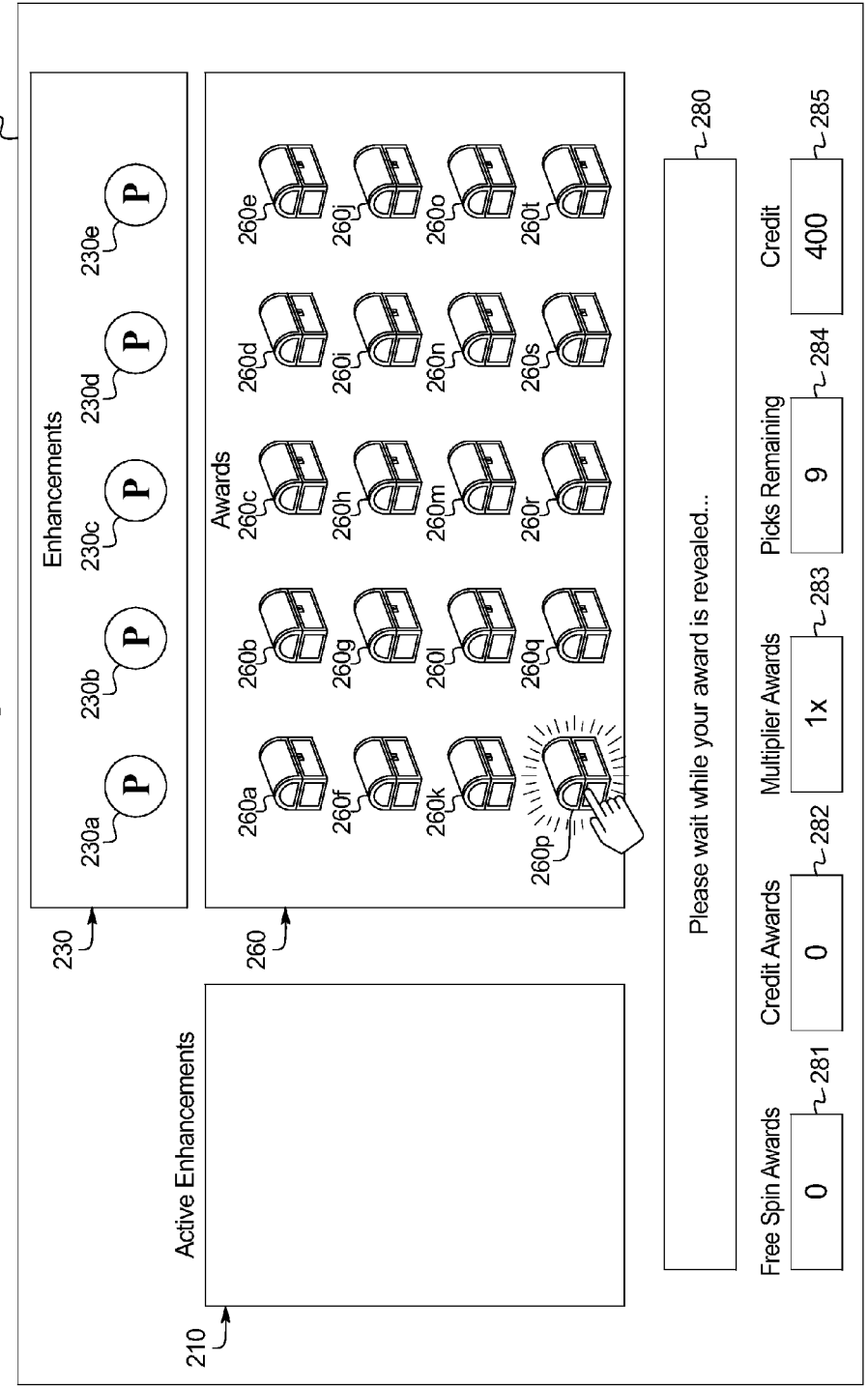

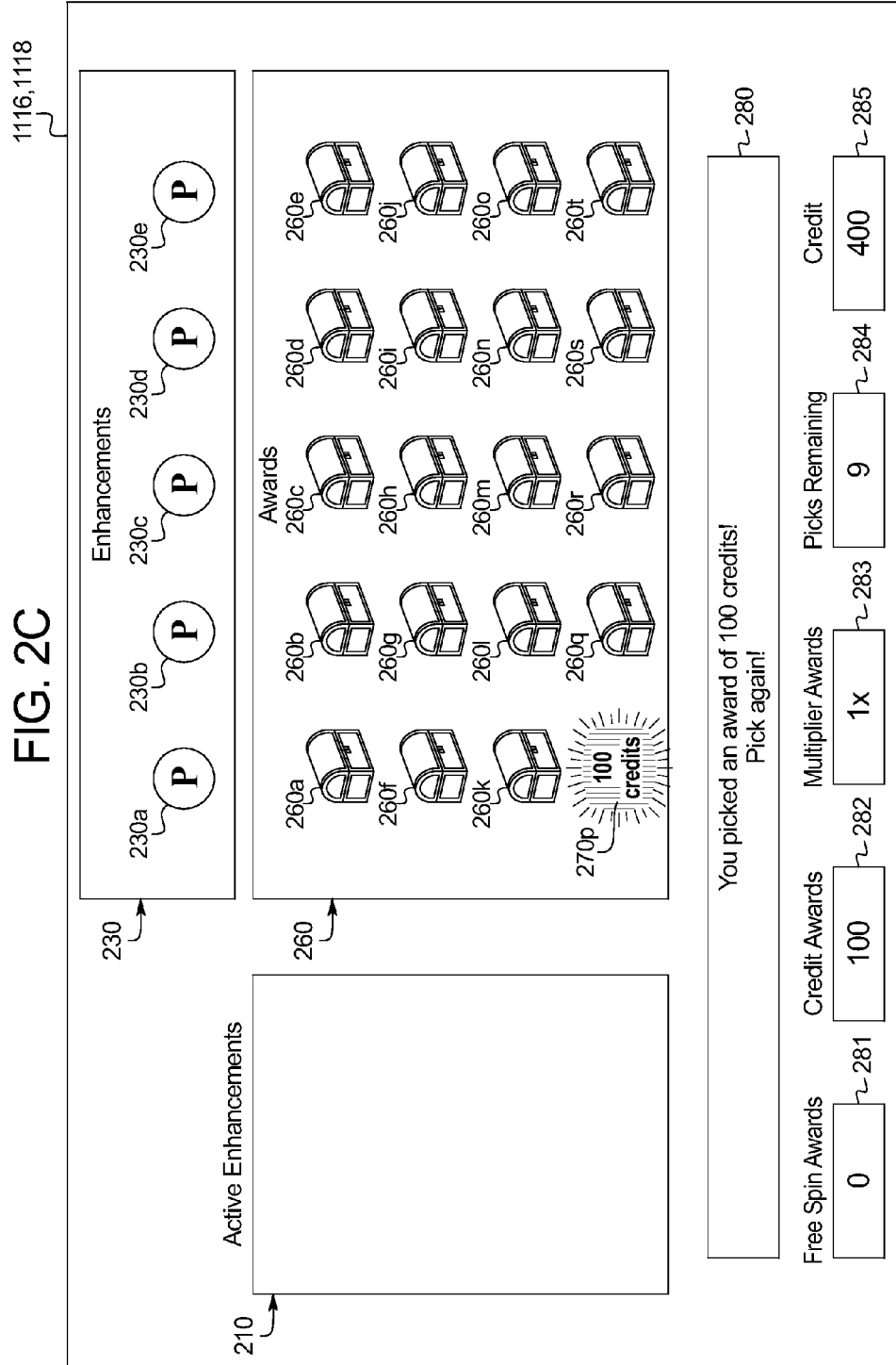

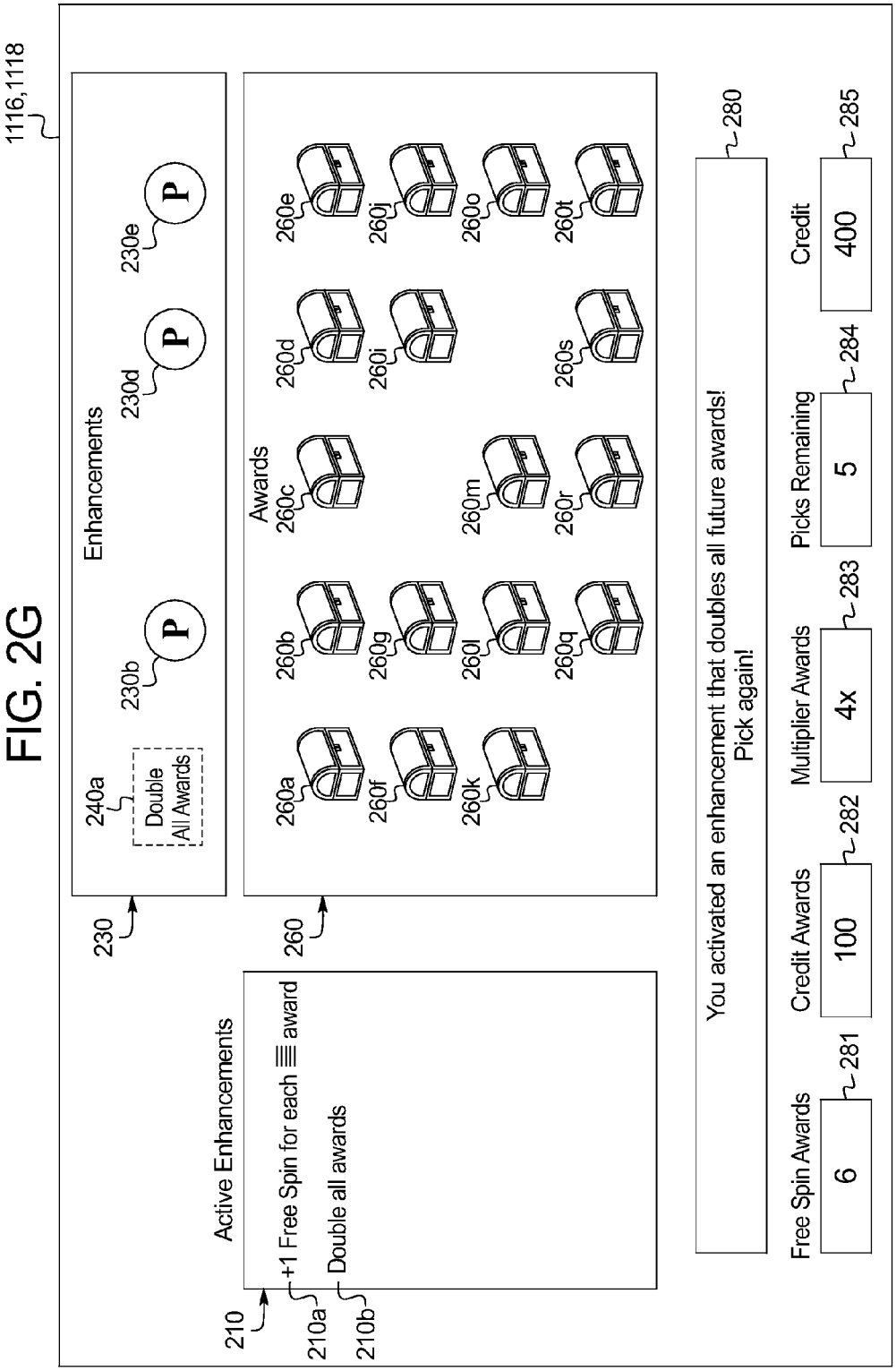

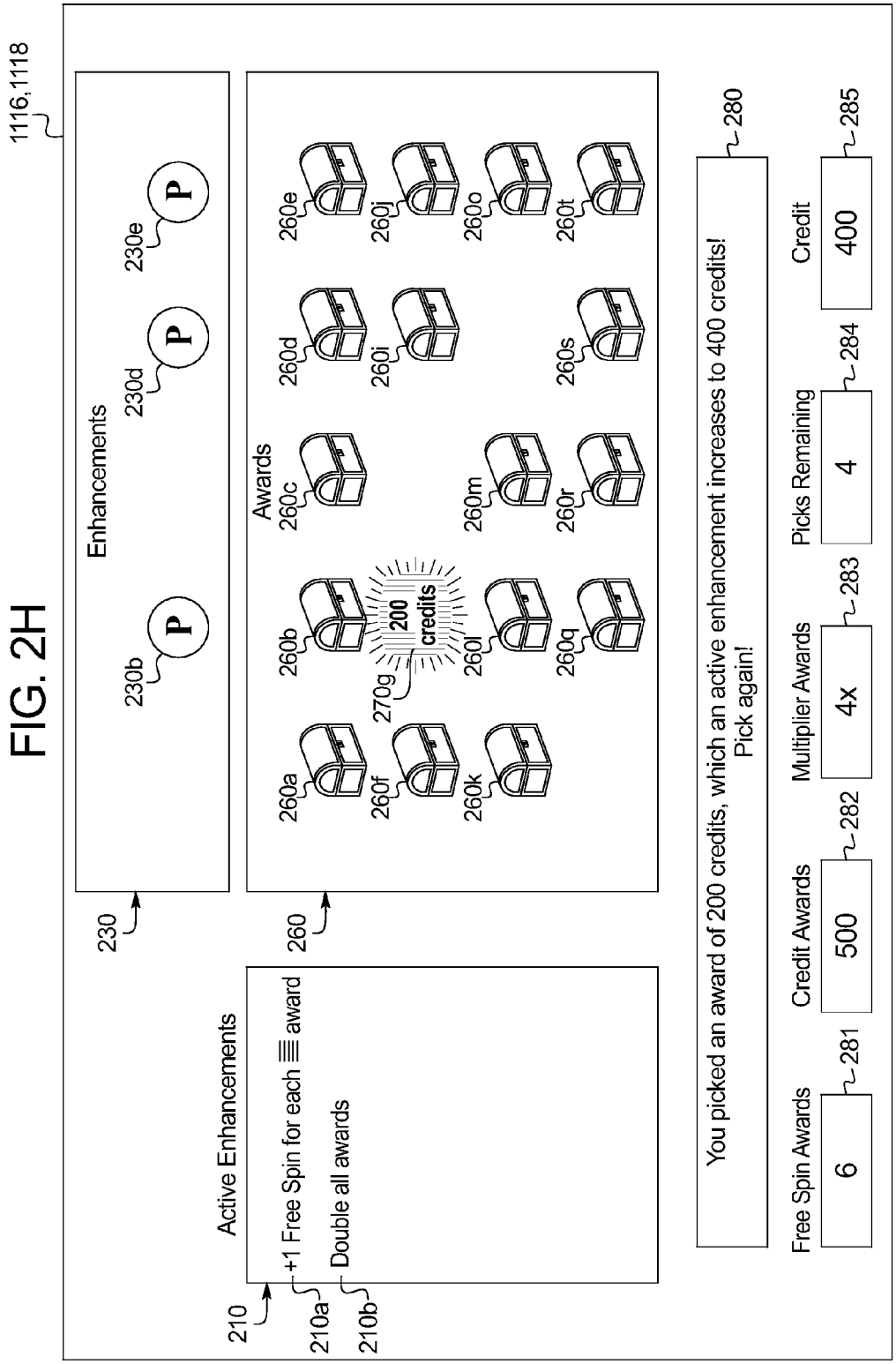

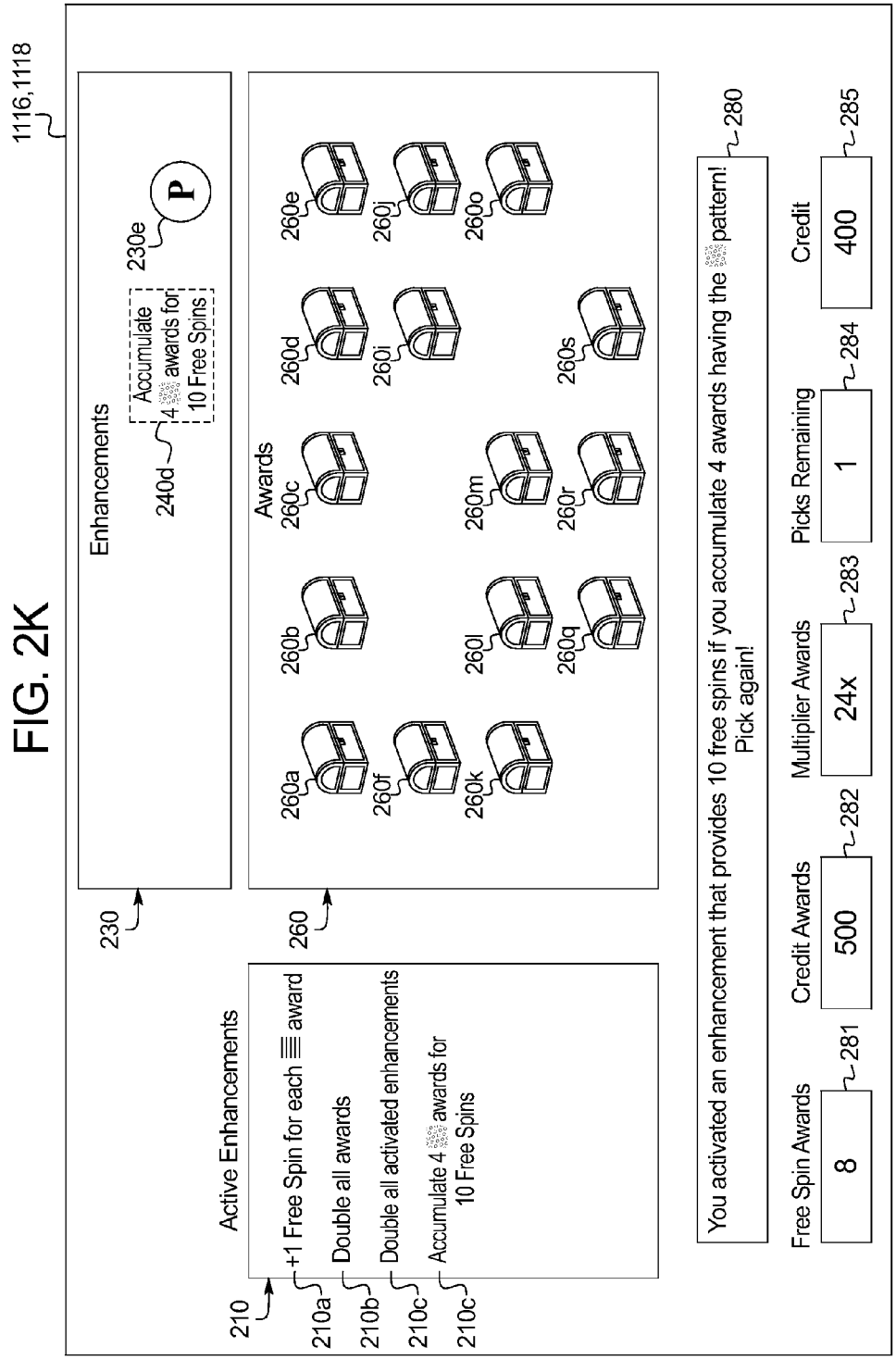

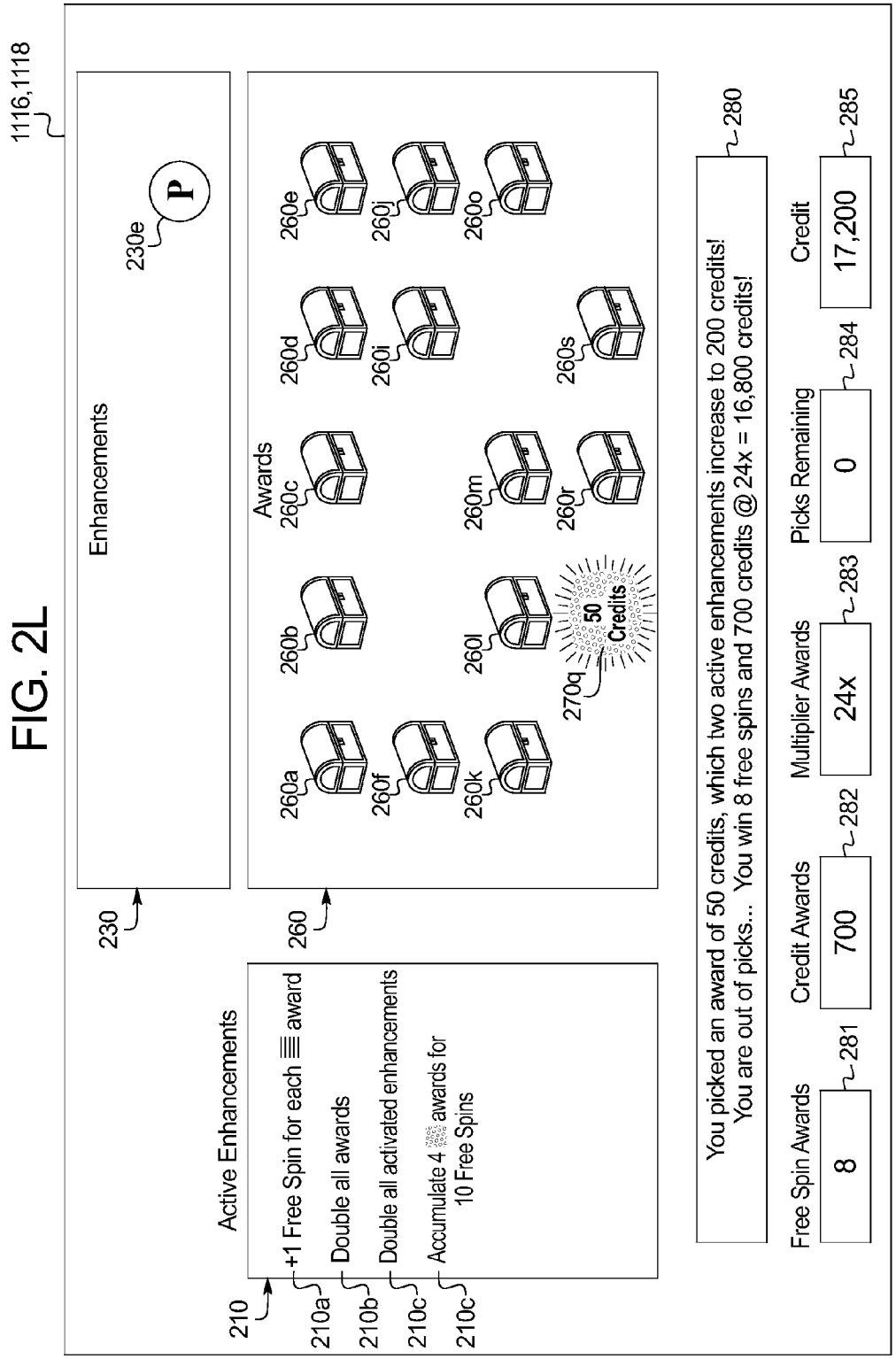

GAMING SYSTEM AND METHOD PROVIDING A SELECTION GAME INCLUDING A FIRST SET OF SELECTIONS ASSOCIATED WITH ACTIVATABLE SELECTION GAME ENHANCEMENTS AND A SECOND SET OF SELECTIONS ASSOCIATED WITH AWARDS

PRIORITY CLAIM

This patent application claims priority to and the benefit of U.S. Provisional Patent Application Ser. No. 62/007,575, filed on Jun. 4, 2014, the entire contents of which are incorporated herein by reference.

COPYRIGHT NOTICE

A portion of the disclosure of this patent document contains or may contain material that is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

BACKGROUND

Gaming systems that provide players awards in primary or base games are well known. These gaming systems generally require a player to place a wager to activate a play of the primary game. For many of these gaming systems, any award provided to a player for a wagered-on play of a primary game is based on the player obtaining a winning symbol or a winning symbol combination and on an amount of the wager (e.g., the higher the amount of the wager, the higher the award). Winning symbols or winning symbol combinations that are less likely to occur typically result in larger awards being provided when they do occur.

For such known gaming systems, an amount of a wager placed on a primary game by a player may vary. For instance, a gaming system may enable a player to wager a minimum quantity of credits, such as one credit (e.g., in monetary currency, one penny, nickel, dime, quarter, or dollar; in non-monetary currency, one point, credit, coin, token, free play credit, or virtual buck), up to a maximum quantity of credits, such as five credits. The gaming system may enable the player to place this wager a single time or multiple times for a single play of the primary game. For instance, a gaming system configured to operate a slot game may have one or more paylines, and the gaming system may enable a player to place a wager on each of the paylines for a single play of the slot game. Thus, it is known that a gaming system, such as one configured to operate a slot game, may enable players to place wagers of substantially different amounts on each play of a primary game. For example, the amounts of the wagers may range from one credit up to 125 credits (e.g., five credits on each of twenty-five separate paylines). This is also true for other wagering games, such as video draw poker, in which players can place wagers of one or more credits on each hand, and in which multiple hands can be played simultaneously. Accordingly, it should be appreciated that different players play at substantially different wager amounts or levels and substantially different rates of play.

Bonus or secondary games are also known in gaming systems. Such gaming systems usually provide an award to a player for a play of one such bonus game in addition to any awards provided for any plays of any primary games. Bonus games usually do not require an additional wager to be placed by the player to be initiated. Bonus games are typically initiated or triggered upon an occurrence of a designated triggering symbol or designated triggering symbol combination in the primary game. For instance, a gaming system may initiate or trigger a bonus game when a bonus symbol occurs on the payline on the third reel of a three reel slot machine. The gaming systems generally indicates when a bonus game is initiated or triggered through one or more visual and/or audio output devices, such as the reels, lights, speakers, display screens, etc. Part of the enjoyment and excitement of playing certain gaming systems is the initiation or triggering of a bonus game, even before the player knows an amount of a bonus award won via the bonus game.

Many known gaming systems employ a variety of different selection-type games as bonus games. Upon an initiation of certain of these known selection-type games, the gaming system displays a plurality of selections or indicators, such as numbers; letters; or graphical representations of people, places, or things, and enables a player to pick one of the displayed selections. If the picked selection is associated with an award, the gaming system provides the player that award. In certain selection-type games, if the picked selection is associated with a game terminator instead of or in addition to an award, the gaming system terminates the selection-type game. In other selection-type games, the gaming system provides the player a limited quantity of picks, and enables the player to use each pick to select one of the displayed selections. In further selection-type games, each selection has a corresponding matching selection. In these selection-type games, the gaming system enables the player to select pairs of selections until the player selects a designated quantity of matching pairs of selections.

Various players continually seek out new and different variations to gaming systems. A continuing need thus exists for gaming systems and methods that provide new, exciting, and engaging games.

SUMMARY

Various embodiments of the present disclosure provide a gaming system and method providing a selection game including a first set of selections each associated with one of a plurality of different activatable selection game enhancements and a different second set of selections each associated with one of a plurality of different awards.

Generally, for a play of the selection game, the gaming system enables a player to use a quantity of picks to pick one or more selections of the first set to cause the gaming system to activate certain of the selection game enhancements without providing awards and/or to pick one or more selections of the second set to cause the gaming system to provide certain of the awards. Each selection game enhancement, when active, causes the gaming system to modify at least one feature of the selection game (such as at least one award, at least one active selection game component, and/or at least one rule of the selection game) to increase the value of the remainder of the play of the selection game. Thus, while picking selections of the first set does not cause the gaming system to provide any awards, picking selections of the first set causes the gaming system to (potentially) render the remainder of the play of the selection game more lucrative via the active selection game enhancements. These embodiments of the gaming system of the present disclosure thus enable the player to obtain a desired balance of risk and reward by allocating the player's picks between the first and second sets of selections.

More specifically, in operation of one embodiment, the gaming system initiates a play of a selection game upon an occurrence of a bonus triggering event in association with a play of a primary wagering game by a player. Upon the occurrence of the bonus triggering event, the gaming system displays a first set of one or more selections. Each selection of the first set is associated with one of a plurality of different activatable selection game enhancements. The gaming system also displays (simultaneously, in this embodiment) a different second set of one or more selections. At least one selection of the second set is associated with one of a plurality of different awards, and each activatable selection game enhancement is associated with one or more of the plurality of different awards.

The gaming system provides the player with a quantity of picks, enables the player to pick one of the displayed selections, and receives a pick of one of the displayed selections. The gaming system reduces the player's quantity of picks (such as by one). The gaming system determines whether the picked selection is one of the one or more selections of the first set or is one of the one or more selections of the second set.

If the gaming system determines that the picked selection is one of the one or more selections of the first set, the gaming system activates the selection game enhancement associated with the picked selection and displays an indication of that (now) active selection game enhancement. The gaming system does so without providing any awards in this embodiment. If the player has at least one pick remaining, the gaming system again enables the player to pick one of the displayed selections. If, on the other hand, the player has no picks remaining, the gaming system ends the play of the selection game.

If the gaming system determines that the picked selection is one of the one or more selections of the second set, the gaming system determines whether any active selection game enhancements are associated with the award associated with the picked selection. If the gaming system determines that at least one active selection game enhancement is associated with the award associated with the picked selection, the gaming system modifies the award associated with the picked selection in accordance with such active selection game enhancement(s) and displays the modified award. If the gaming system determines that no active selection game enhancements are associated with the award associated with the picked selection, the gaming system displays the award associated with the picked selection. If the player has at least one pick remaining, the gaming system again enables the player to pick one of the displayed selections. If, on the other hand, the player has no picks remaining, the gaming system ends the play of the selection game.

It should thus be appreciated that the gaming system and method of the present disclosure provide a new selection game to increase player engagement, enjoyment, entertainment, and excitement.

Additional features and advantages are described herein, and will be apparent from, the following Detailed Description and the Figures.

BRIEF DESCRIPTION OF THE FIGURES

FIG. 1 is a flowchart illustrating an example method of operating one embodiment of the gaming system of the present disclosure.

FIGS. 2A, 2B, 2C, 2D, 2E, 2F, 2G, 2H, 2I, 2J, 2K, and 2L illustrate screen shots of one example embodiment of the gaming system of the present disclosure providing the selection game.

DETAILED DESCRIPTION

Figure 2D:
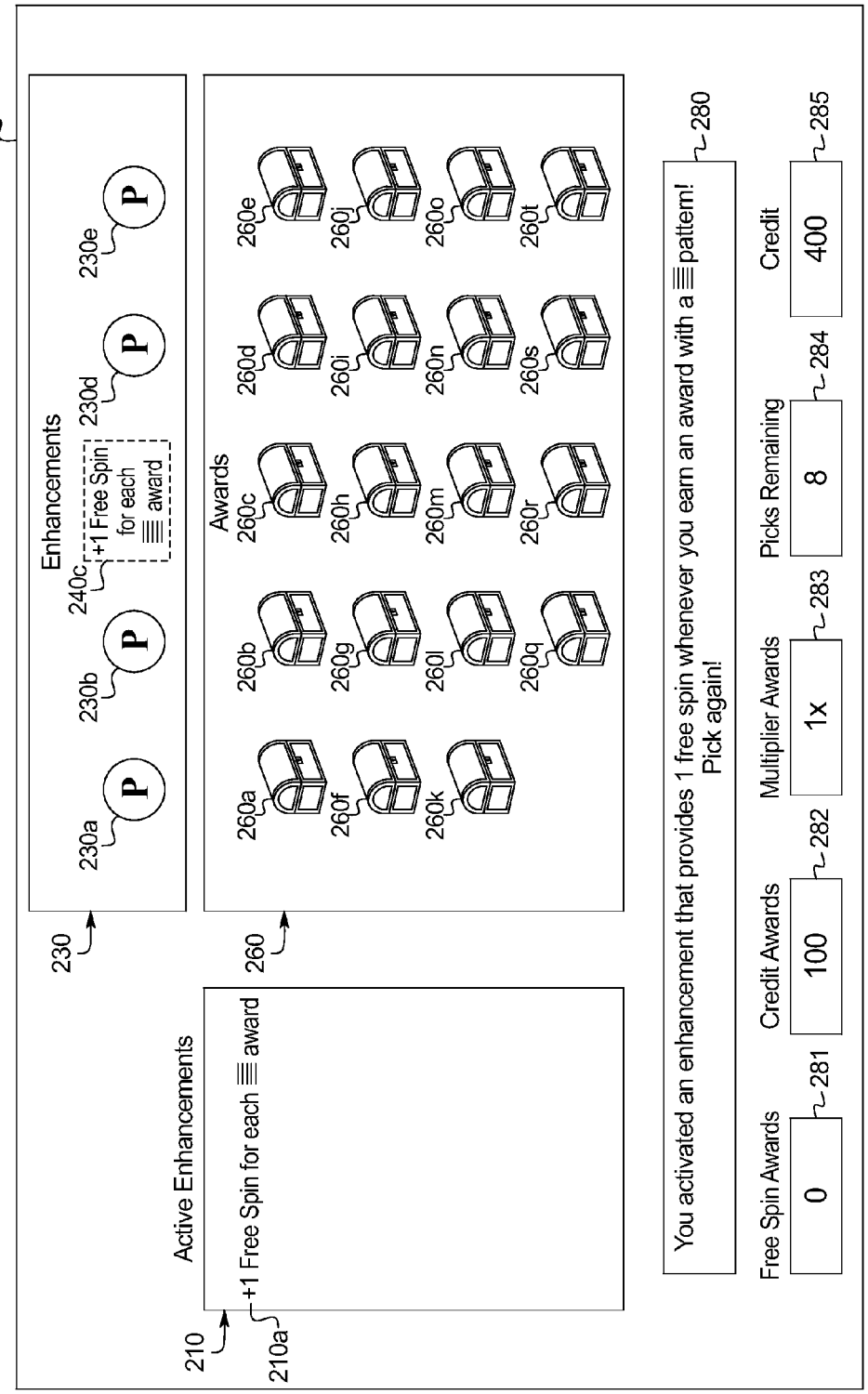

Selection Game Including a First Set of Selections Associated with Activatable Selection Game Enhancements and a Second Set of Selections Associated with Awards Various embodiments of the present disclosure provide a gaming system and method providing a selection game including a first set of selections each associated with one of a plurality of different activatable selection game enhancements and a different second set of selections each associated with one of a plurality of different awards.

Generally, for a play of the selection game, the gaming system enables a player to use a quantity of picks to pick one or more selections of the first set to cause the gaming system to activate certain of the selection game enhancements without providing awards and/or to pick one or more selections of the second set to cause the gaming system to provide certain of the awards. Each selection game enhancement, when active, causes the gaming system to modify at least one feature of the selection game (such as at least one award, at least one active selection game component, and/or at least one rule of the selection game) to increase the value of the remainder of the play of the selection game. Thus, while picking selections of the first set does not cause the gaming system to provide any awards, picking selections of the first set causes the gaming system to (potentially) render the remainder of the play of the selection game more lucrative via the active selection game enhancements. These embodiments of the gaming system of the present disclosure thus enable the player to obtain a desired balance of risk and reward by allocating the player's picks between the first and second sets of selections.

Although the selection game is described as a bonus game in the embodiments described herein, it should be appreciated that the selection game of the present disclosure may additionally or alternatively be implemented as a primary game. Further, while any credit balances, any wagers, and any awards are displayed as amounts of monetary currency or credits, one or more of such credit balances, such wagers, and such awards may be for any suitable non-monetary credits or currency, such as promotional credits and/or player tracking points or credits.

FIG. 1 illustrates a flowchart of an example process or method 100 of operating one embodiment of the gaming system of the present disclosure. In various embodiments, the process 100 is represented by a set of instructions stored in one or more memories and executed by one or more processors. Although the process 100 is described with reference to the flowchart shown in FIG. 1, it should be appreciated that many other processes of performing the acts associated with this illustrated process 100 may be employed. For example, the order of certain of the illustrated blocks and/or diamonds may be changed, certain of the illustrated blocks and/or diamonds may be optional, and/or certain of the illustrated blocks and/or diamonds may not be employed.

In operation of one embodiment, the process 100 begins upon an occurrence of a bonus triggering event in association with a play of a primary wagering game by a player. Upon the occurrence of the bonus triggering event, the gaming system displays a first set of one or more selections, as indicated by block 102. Each selection of the first set is associated with one of a plurality of different activatable selection game enhancements. The gaming system also displays (simultaneously, in this example embodiment) a different second set of one or more selections, as indicated by block 104. At least one selection of the second set is associated with one of a plurality of different awards, and each activatable selection game enhancement is associated with one or more of the plurality of different awards. The gaming system provides the player with a quantity of picks, as indicated by block 106.

The gaming system enables the player to pick one of the displayed selections, and receives a pick of one of the displayed selections, as indicated by block 108. The gaming system reduces the player's quantity of picks (such as by one), as indicated by block 110. The gaming system determines whether the picked selection is one of the one or more selections of the first set, as indicated by diamond 112. If the gaming system determines that the picked selection is one of the one or more selections of the first set, the gaming system activates the selection game enhancement associated with the picked selection and displays an indication of that (now) active selection game enhancement, as indicated by block 114. The gaming system does so without providing any awards in this example embodiment. The process 100 then proceeds to diamond 122, described below.

If, on the other hand, the gaming system determines at the diamond 112 that the picked selection is one of the one or more selections of the second set (i.e., is not one of the one or more selections of the first set), the gaming system determines whether any active selection game enhancements are associated with the award associated with the picked selection, as indicated by diamond 116. If the gaming system determines that at least one active selection game enhancement is associated with the award associated with the picked selection, the gaming system modifies the award associated with the picked selection in accordance with such active selection game enhancement(s) and displays the modified award, as indicated by block 118. The process 100 then proceeds to the diamond 122, described below.

If, on the other hand, the gaming system determines at diamond 116 that no active selection game enhancements are associated with the award associated with the picked selection, the gaming system displays the award associated with the picked selection, as indicated by block 120. The gaming system determines whether the player has at least one pick remaining, as indicated by the diamond 122. If the gaming system determines that the player has at least one pick remaining, the process 100 returns to the block 108. If, on the other hand, the gaming system determines that the player has no picks remaining, the process 100 ends.

It should be appreciated that the plurality of awards may include any suitable awards such as, but not limited to, one or more of: (1) monetary credits or currency; (2) non-monetary credits or currency; (3) a modifier (such as a multiplier) used to modify one or more awards (such as a total credit award following use of the player's final pick in the selection game); (4) one or more free plays of a game (such as one or more free spins of a slot game); (5) one or more plays of one or more bonus games (such as a free spin of an award wheel); (6) one or more lottery based awards (such as one or more lottery or drawing tickets); (7) a wager match for one or more plays of the a wagering game; (8) an increase in an average expected payback percentage of a bonus game and/or an average expected payback percentage of a primary wagering game for one or more plays; (9) one or more comps (such as a free dinner or a free night's stay at a hotel); (10) one or more bonus or promotional credits usable for online play; (11) one or more player tracking points; (12) a modifier (such as a multiplier) for player tracking points or credits; (13) an increase in a membership or player tracking level; (14) one or more coupons or promotions usable within a gaming establishment and/or outside of the gaming establishment (e.g., a 20% off coupon for use at a retail store or a promotional code providing a deposit match for use in association with an online casino); (15) an access code usable to unlock content on the Internet; (16) a progressive jackpot or other progressive award; (17) a high value product or service (such as a car); (18) a low value product or service (such as a teddy bear); and (19) a retrigger of the bonus game.

As noted above, each selection game enhancement is associated with one or more features of the selection game and, when active, causes the gaming system to modify the associated one or more features of the selection game to increase the value of the remainder of the play of the selection game. Put differently, when the gaming system activates a selection game enhancement and modifies the associated one or more features of the selection game in accordance with that particular active selection game enhancement, the gaming system is more likely to provide larger or a greater quantity of awards than if that particular active selection game enhancement was not active.

In certain embodiments, one or more selection game enhancements are each associated with one or more of the awards. In these embodiments, when the gaming system activates one such selection game enhancement, the gaming system modifies the award(s) associated with that particular active selection game enhancement to increase the value of the award(s) before providing the award(s) to the player. In certain such embodiments, the gaming system modifies the associated award(s) before the gaming system receives a pick of the selection(s) of the second set associated with those award(s). In other such embodiments, the gaming system modifies the associated award(s) when the gaming system receives a pick of the selection(s) of the second set associated with those award(s).

It should be appreciated that each such selection game enhancement may be associated with any suitable award or awards. In one embodiment, certain such selection game enhancements are associated with all of the awards and other such selection game enhancements are associated with at least one, but fewer than all, of the awards. In certain embodiments, at least one selection game enhancement is associated with a randomly determined award or awards. In other embodiments, at least one selection game enhancement is associated with a player selected award or awards. In various embodiments, at least one selection game enhancement is associated with all awards of a particular type of awards (e.g., all free spin awards, all credit awards, or all multiplier awards).

In various embodiments, each of the awards is associated with at least one of a plurality of different characteristics, such as colors, patterns, and the like. In these embodiments, each such selection game enhancement is also associated with at least one of the plurality of different characteristics. In certain such embodiments, for each such selection game enhancement, that selection game enhancement is associated with each award that has at least one same characteristic as that selection game enhancement. For instance, in one such example embodiment, a selection game enhancement that is blue and red is associated with each award that is at least one of blue and red. In other such embodiments, for each such selection game enhancement, that selection game enhancement is associated with each award that has the exact same characteristic(s) as that selection game enhancement. For instance, in one such example embodiment, a selection game enhancement that is blue and red is associated with each award that is also blue and red but is not associated with any awards that are blue, red, and another color. In other such embodiments, for each such selection game enhancement, that selection game enhancement is associated with each award that has at least the same characteristic(s) as that selection game enhancement. For instance, in one such example embodiment, a selection game enhancement that is blue and red is associated with each award that is blue and red and each award that is blue and red and any other color.

In various embodiments, the selection game enhancements associated with one or more of the awards include one or more of: (1) a selection game enhancement that, when active, causes the gaming system to modify the associated award(s) to include N additional picks provided to the player, wherein N is any suitable number (such as one) (e.g., modify all awards having a first characteristic to include +1 pick); (2) a selection game enhancement that, when active, causes the gaming system to modify the associated award(s) by increasing the award(s) by a factor of NX, wherein N is any suitable number greater than one (e.g., modify all awards by 2× or modify all credit awards by 3×); and (3) a selection game enhancement that, when active, causes the gaming system to modify the associated award(s) by providing an additional N awards, wherein N is any suitable number and the awards are any suitable award (e.g., modify all multiplier awards to include +100 credits, modify all awards to include +1 free spin, or modify all free spin awards to include a 2× multiplier). It should be appreciated that such selection game enhancements, when active, may be additive or multiplicative with respect to one another.

In certain embodiments, each award may be modified by up to a designated quantity of (such as two) selection game enhancements at once. In one such embodiment, if a plurality of active selection game enhancements are applicable to a particular award, the gaming system modifies that award using the active selection game enhancement that provides the greatest increase in the value of that award. In another such embodiment, if a plurality of active selection game enhancements are applicable to a particular award, the gaming system modifies that award using a player-selected active selection game enhancement. In other embodiments, however, each award may be modified by any suitable number of selection game enhancements.

In certain embodiments, one or more selection game enhancements are each associated with one or more other selection game enhancements. In these embodiments, when the gaming system activates one such selection game enhancement, the gaming system modifies the other selection game enhancement(s) associated with that particular active selection game enhancement to increase the value of the remainder of the play of the selection game. In one embodiment, the gaming system modifies the associated selection game enhancements only if such associated selection game enhancements are active at the time the gaming system activates that particular selection game enhancement. In another embodiment, the gaming system modifies the associated selection game enhancements regardless of whether such associated selection game enhancements are active. In certain such embodiments, the gaming system modifies any associated inactive selection game enhancements before the gaming system receives a pick of the selection(s) of the first set associated with the selection game enhancement(s). In other such embodiments, the gaming system modifies the associated inactive selection game enhancement(s) when the gaming system receives a pick of the selection(s) of the first set associated with the selection game enhancement(s).

It should be appreciated that each such selection game enhancement may be associated with any other suitable selection game enhancement or enhancements. In one embodiment, certain selection game enhancements are associated with all of the other selection game enhancements and other selection game enhancements are associated with at least one, but fewer than all, of the other selection game enhancements. In various embodiments, the selection game enhancements associated with one or more of the other selection game enhancements include one or more of: (1) a selection game enhancement that, when active, causes the gaming system to increase the effect of any already-active selection game enhancements by a factor of NX, wherein N is any suitable number greater than one (e.g., double the effect of all active selection game enhancements); and (2) a selection game enhancement that, when active, causes the gaming system to modify any already-active selection game enhancement associated with fewer than all of the awards to be associated with all of the awards (e.g., modify an active selection game enhancement that modifies all credit awards to include +1 free spin such that all awards include +1 free spin).

In certain embodiments, each selection game enhancement may be modified by up to a designated quantity of (such as two) other selection game enhancements at once. In one such embodiment, if a plurality of active selection game enhancements are applicable to a particular selection game enhancement, the gaming system modifies that selection game enhancement using the active selection game enhancement that provides the greatest increase in the value of that selection game enhancement. In another such embodiment, if a plurality of active selection game enhancements are applicable to a particular selection game enhancement, the gaming system modifies that selection game enhancement using a player-selected active selection game enhancement. In other embodiments, however, each selection game enhancement may be modified by any suitable number of selection game enhancements.

In certain embodiments, one or more selection game enhancements are each associated with one or more selection game rules. In these embodiments, when the gaming system activates one such selection game enhancement, the gaming system modifies the rules of the selection game to increase the value of the remainder of the play of the selection game. In various embodiments, the selection game enhancements associated with one or more selection game rules include one or more of: (1) a selection game enhancement that, when active, causes the gaming system to provide a designated award (e.g., a quantity of credits, a quantity of free spins, a modifier, another play of the selection game, or any other suitable award) if the player accomplishes a task during the play of the selection game (e.g., by accumulating at least a designated quantity of awards associated with a particular characteristic); (2) a selection game enhancement that, when active, causes the gaming system to add at least one additional selection to the first set and the second set (e.g., the gaming system replaces any picked selection with a new selection); and (3) a selection game enhancement that, when active, causes the gaming system to set a goal that, if achieved during play of the selection game, causes the gaming system to provide the player an award (e.g., if the player collects N awards of a particular type, the gaming system retriggers the selection game or if the player collects all awards of a particular type, the gaming system modifies the player's credit award for the selection game using a multiplier).

FIGS. 2A, 2B, 2C, 2D, 2E, 2F, 2G, 2H, 2I, 2J, 2K, and 2L illustrate screen shots of one example embodiment of the gaming system of the present disclosure providing the selection game. In this example embodiment, upon initiation of the selection game, the gaming system displays a first selection set display area 230 including a first set of a plurality of selections 230*a*, 230*b*, 230*c*, 230*d*, and 230*e*. Each of the selections of the first set is associated with a different one of a plurality of different activatable selection game enhancements. The activatable selection game enhancements associated with the selections of the first set are initially masked (i.e., are not initially displayed). The gaming system displays a second selection set display area 260 including a second set of a plurality of selections 260*a*, 260*b*, 260*c*, 260*d*, 260*e*, 260*f*, 260*g*, 260*h*, 260*i*, 260*j*, 260*k*, 260*l*, 260*m*, 260*n*, 260*o*, 260*p*, 260*q*, 260*r*, 260*s*, and 260*t*. Each of the selections of the second set is associated with a different one of a plurality of different awards, each of which has or is otherwise associated with one of the following three patterns: a horizontal stripes pattern, a diagonal stripes pattern, and a dotted pattern. In this embodiment, each award is one of: a quantity of free spins, a quantity of credits, and a multiplier having a particular value. The awards associated with the selections of the second set are also initially masked (i.e., not initially displayed).

The gaming system also displays: (a) an active selection game enhancements display area 210 that displays an indication of each active selection game enhancement; (b) a message box 280 that displays a variety of messages or indications before, during, or after play of the selection game; and (c) a plurality of meters including: (i) a free spin awards meter 281 that displays a sum of any free spin awards provided to the player during the play of the selection game, (ii) a credit awards meter 282 that displays a sum of any credit awards provided to the player during the play of the selection game, (iii) a multiplier awards meter 283 that displays a sum of any multiplier awards provided to the player during the play of the selection game, (iv) a picks remaining meter 284 that displays the player's remaining quantity of picks, and (v) a credit meter 285 that displays the player's credit balance.

Turning to FIG. 2A, upon the occurrence of the triggering event, the gaming system initiates a play of the selection game and displays the following message in the message box 280: "USE YOUR PICKS TO SELECT EITHER ENHANCEMENTS OR AWARDS!"

As shown in FIG. 2B, the gaming system enables the player to use one of the player's picks to pick one of the displayed selections, and receives a pick of the selection 260*p* of the second set. The gaming system reduces the player's quantity of picks by one (as shown in the picks remaining meter 284), and displays the following message in the message box 280: "PLEASE WAIT WHILE YOUR AWARD IS REVEALED . . . "

As shown in FIG. 2C, the gaming system reveals the associated award 270*p* of 100 credits having the diagonal stripes pattern. The gaming system increases the sum of the credit awards displayed in the credit awards meter 282 by 100 credits from 0 credits to 100 credits, and displays the following message in the message box 280: "YOU PICKED AN AWARD OF 100 CREDITS! PICK AGAIN!"

As shown in FIG. 2D, the gaming system receives a pick of the selection 230*c* of the first set, reveals and activates the selection game enhancement 240*c* associated with the picked selection 230*c*, and reduces the player's quantity of picks by one (as shown in the picks remaining meter 284). Here, the picked selection 230*c* is associated with a selection game enhancement 240*c* that, when active, causes the gaming system to modify any awards having the horizontal stripes pattern to include an additional award of 1 free spin. Thus, the selection game enhancement 240*c* is associated with, and causes the gaming system to modify, each award having the horizontal stripes pattern. The gaming system displays an indication 210*a* of this (now) active selection game enhancement in the active selection game enhancements display area 210. The gaming system displays the following message in the message box 280: "YOU ACTIVATED AN ENHANCEMENT THAT PROVIDES 1 FREE SPIN WHENEVER YOU EARN AN AWARD WITH A HORIZONTAL STRIPES PATTERN! PICK AGAIN!"

Figure 2E:
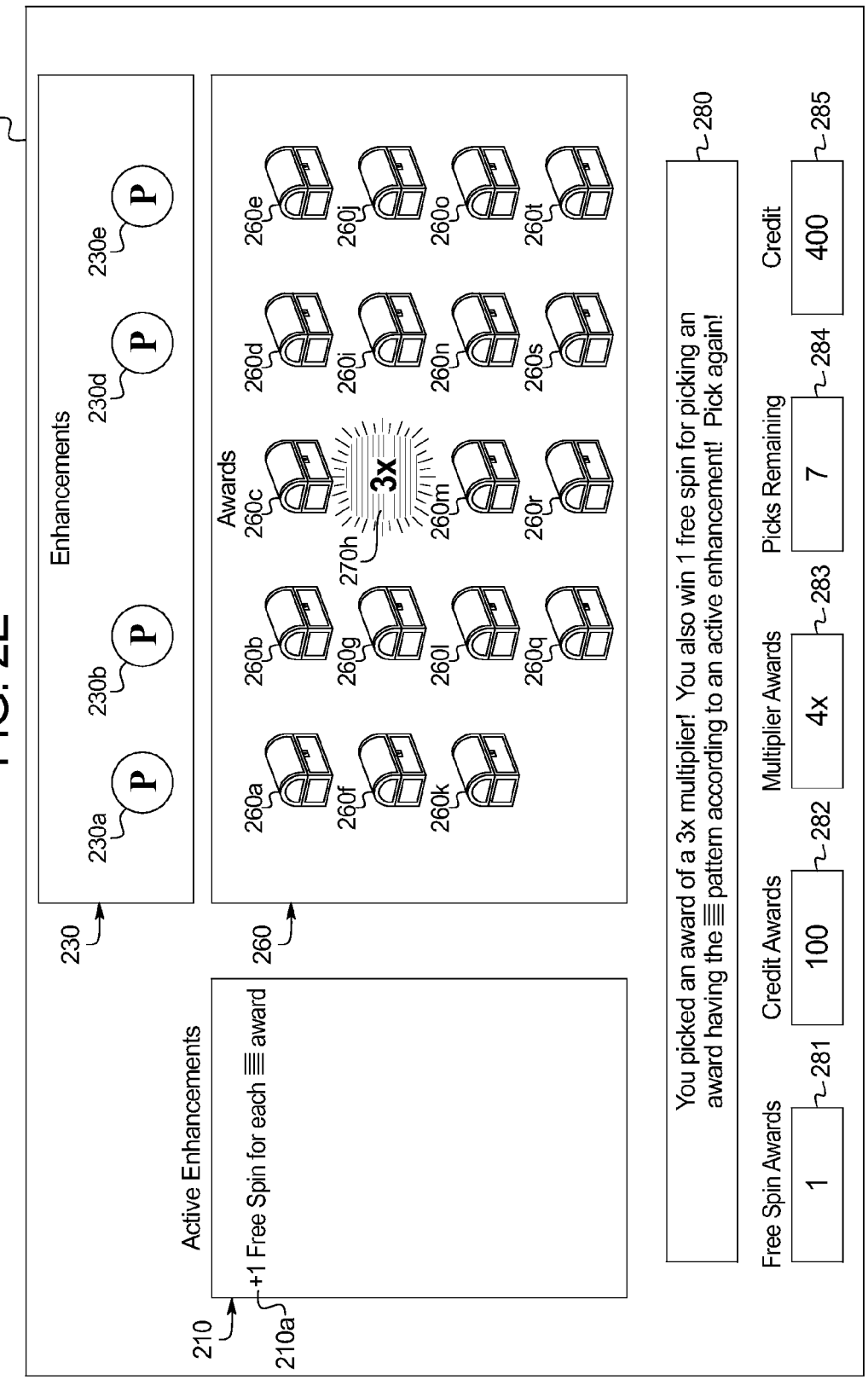

As shown in FIG. 2E, the gaming system receives a pick of the selection 260*h* of the second set, reveals the associated award 270*h* of a 3× multiplier having the horizontal stripes pattern, and reduces the player's quantity of picks by one (as shown in the picks remaining meter 284). The gaming system increases the sum of the multiplier awards displayed in the multiplier awards meter 283 by 3× from 1× to 4×. Since the award 270*h* of the 3× multiplier associated with the picked selection 260*h* has the horizontal stripes pattern, the gaming system provides an additional award of 1 free spin in accordance with the active selection game enhancement 210*a*, and increases the sum of the free spin awards displayed in the free spin award meter 281 by 1 free spin from 0 free spins to 1 free spin. The gaming system displays the following message in the message box 280: "YOU PICKED AN AWARD OF A 3× MULTIPLIER! YOU ALSO WIN 1 FREE SPIN FOR PICKING AN AWARD HAVING THE HORIZONTAL STRIPES PATTERN ACCORDING TO AN ACTIVE ENHANCEMENT! PICK AGAIN!"

Figure 2F:
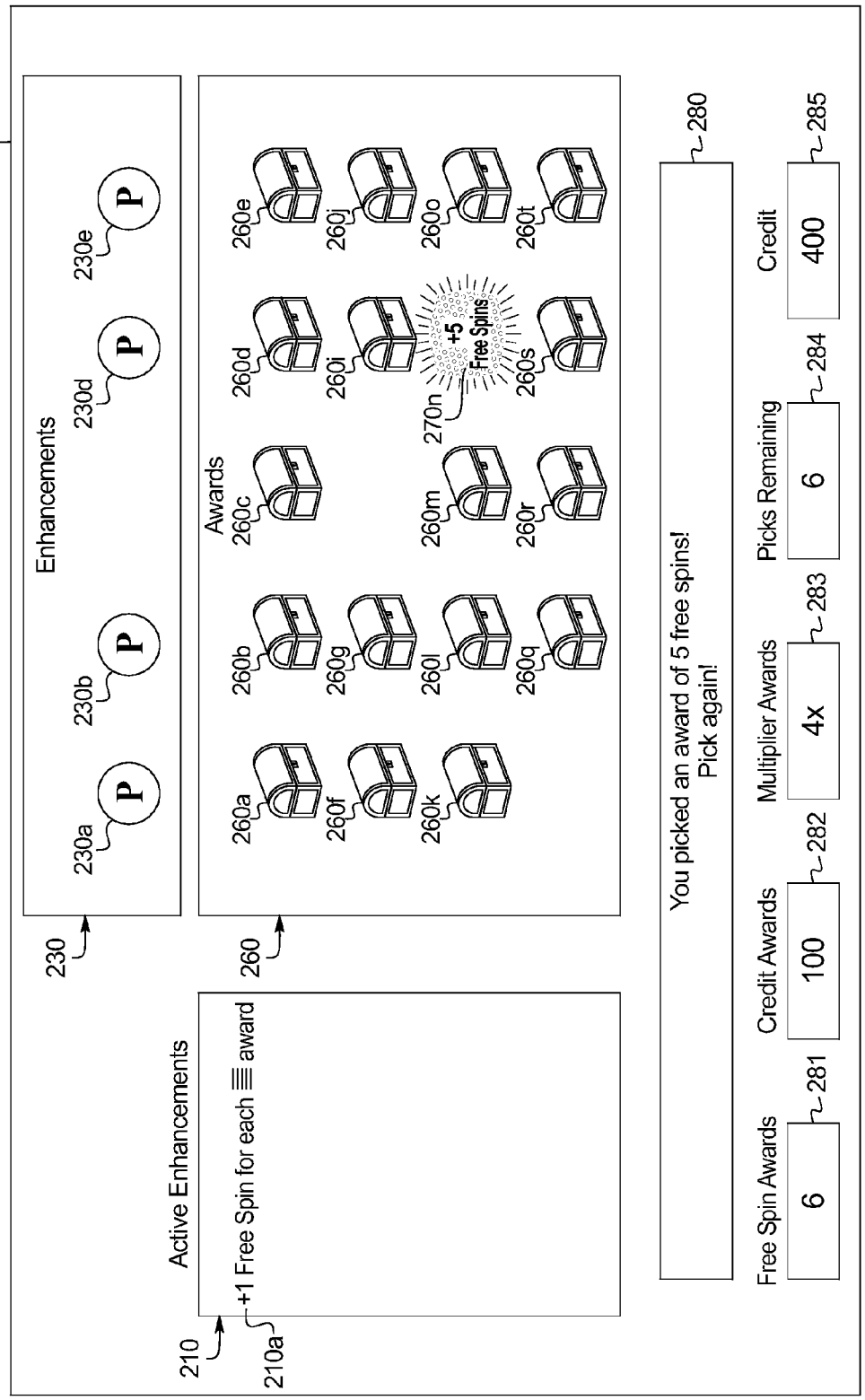

As shown in FIG. 2F, the gaming system receives a pick of the selection 260*n* of the second set, reveals the associated award 270*n* of 5 free spins having the dotted pattern, and reduces the player's quantity of picks by one (as shown in the picks remaining meter 284). The gaming system increases the sum of the free spin awards displayed in the free spin award meter 281 by 5 free spins from 1 free spins to 6 free spins. The gaming system displays the following message in the message box 280: "YOU PICKED AN AWARD OF 5 FREE SPINS! PICK AGAIN!"

As shown in FIG. 2G, the gaming system receives a pick of the selection 230*a* of the first set, reveals and activates the selection game enhancement 240*a* associated with the picked selection 230*a*, and reduces the player's quantity of picks by one (as shown in the picks remaining meter 284). Here, the picked selection 230*a* is associated with a selection game enhancement 240*a* that, when active, causes the gaming system to double the value of any subsequently-earned awards. Thus, the selection game enhancement 240*a* is associated with, and causes the gaming system to modify, each subsequently earned award. The gaming system displays an indication 210*b* of this (now) active selection game enhancement in the active selection game enhancements display area 210. The gaming system displays the following message in the message box 280: "YOU ACTIVATED AN ENHANCEMENT THAT DOUBLES ALL FUTURE AWARDS! PICK AGAIN!"

As shown in FIG. 2H, the gaming system receives a pick of the selection 260g of the second set, reveals the associated award 270g of 200 credits having the diagonal stripes pattern, and reduces the player's quantity of picks by one (as shown in the picks remaining meter 284). The gaming system doubles the 200 credit award from 200 credits to 400 credits in accordance with the active selection game enhancement 210b, and increases the sum of the credit awards displayed in the credit awards meter 282 by 400 credits from 100 credits to 500 credits. The gaming system displays the following message in the message box 280: "YOU PICKED AN AWARD OF 200 CREDITS, WHICH AN ACTIVE ENHANCEMENT INCREASES TO 400 CREDITS! PICK AGAIN!"

Figure 2I:
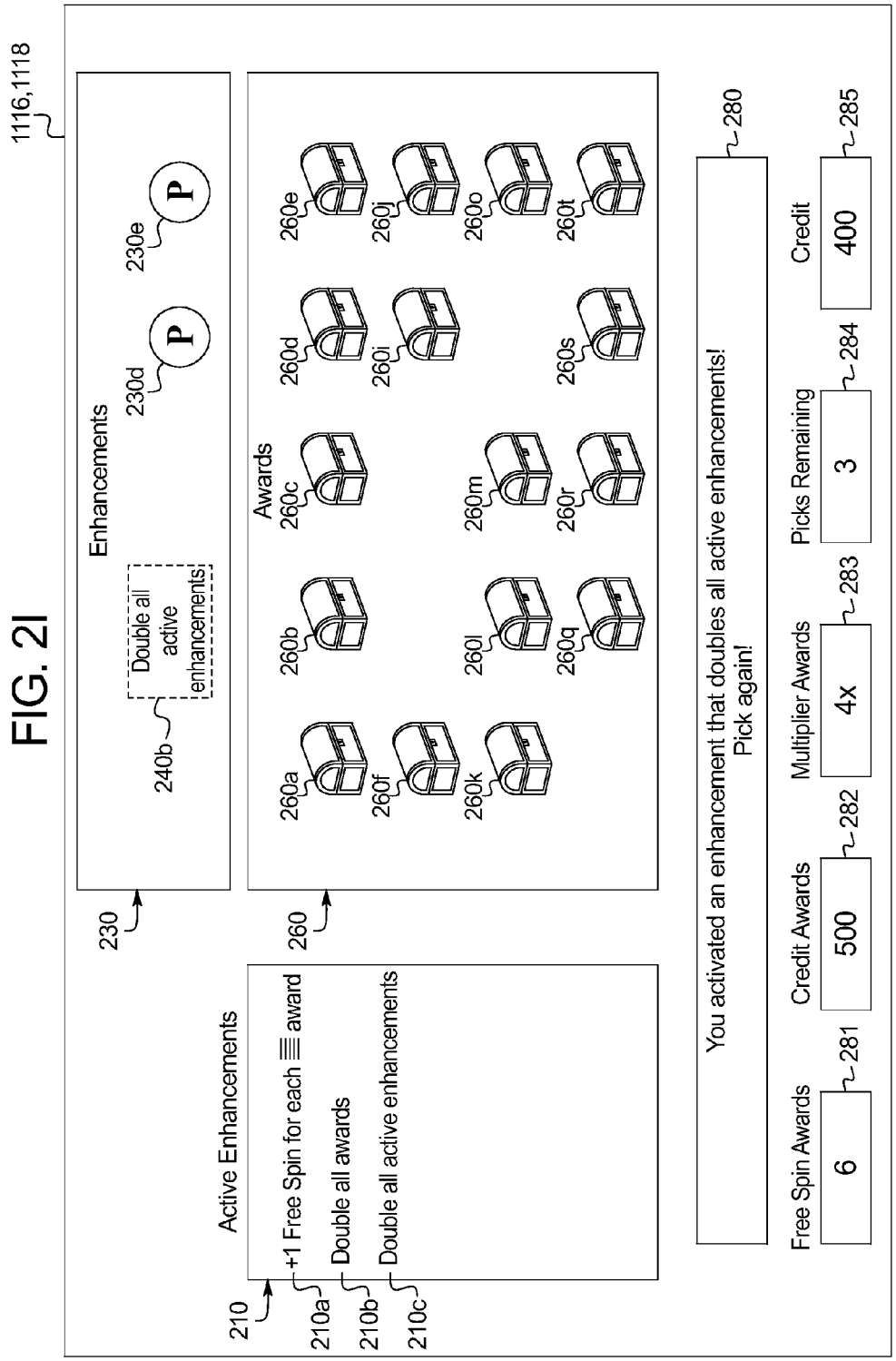

As shown in FIG. 2I, the gaming system receives a pick of the selection 230b of the first set, reveals and activates the selection game enhancement 240b associated with the picked selection 230b, and reduces the player's quantity of picks by one (as shown in the picks remaining meter 284). Here, the picked selection 230b is associated with a selection game enhancement 240b that, when active, causes the gaming system to double the value of any previously or subsequently active enhancements. Thus, the selection game enhancement 240b is associated with, and causes the gaming system to modify, each other previously or subsequently active selection game enhancement. The gaming system displays an indication 210c of this (now) active selection game enhancement in the active selection game enhancements display area 210. The gaming system displays the following message in the message box 280: "YOU ACTIVATED AN ENHANCEMENT THAT DOUBLES ALL ACTIVE ENHANCEMENTS! PICK AGAIN!"

Figure 2J:
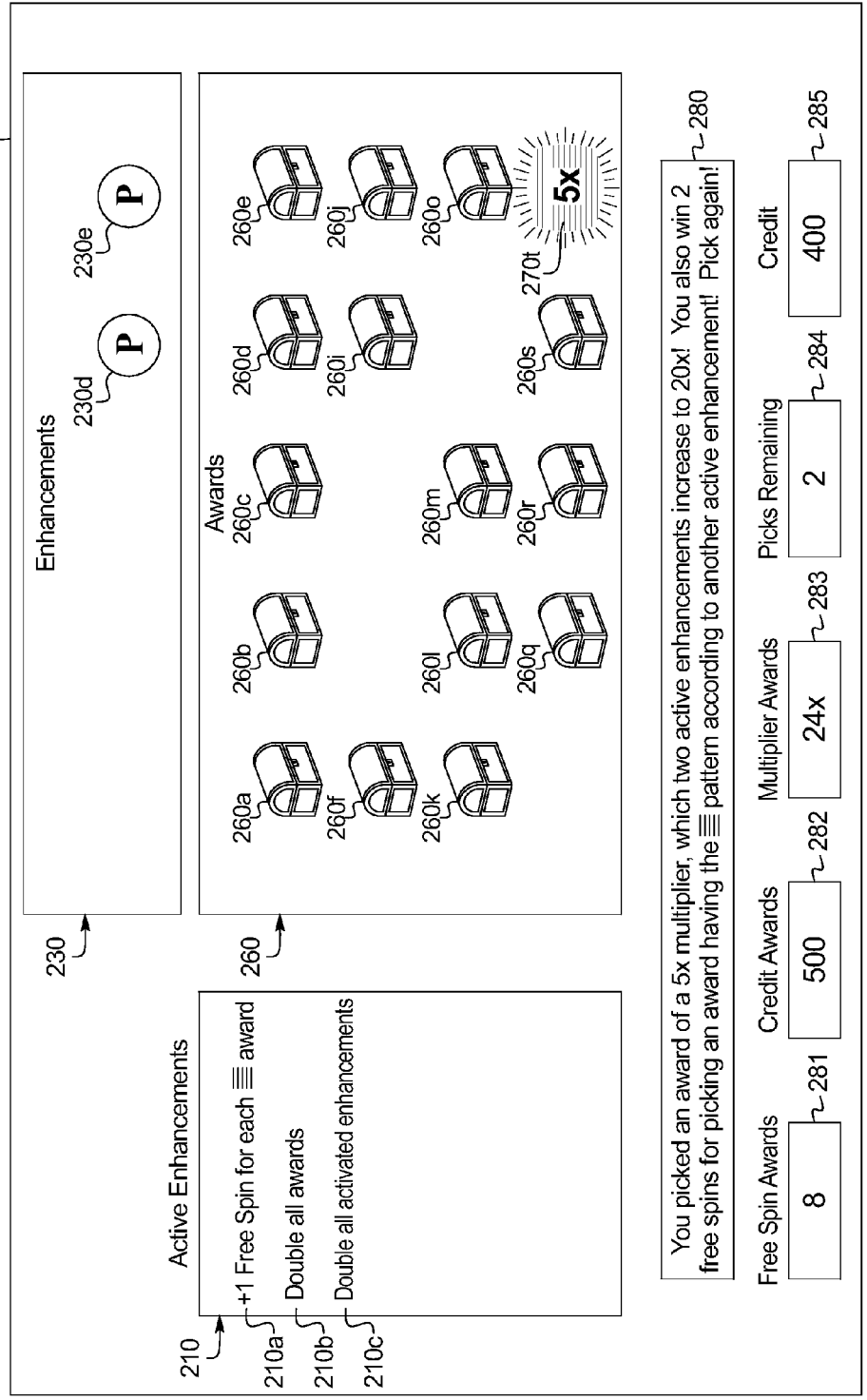

As shown in FIG. 2J, the gaming system receives a pick of the selection 260t of the second set, reveals the associated award 270t of a 5× multiplier having the horizontal stripes pattern, and reduces the player's quantity of picks by one (as shown in the picks remaining meter 284). The gaming system doubles the 5× multiplier award from 5× to 10× according to the active selection game enhancement 210b, and then again doubles the 10× multiplier award from 10× to 20× according to the active selection game enhancement 210c. The gaming system increases the sum of the multiplier awards displayed in the multiplier awards meter 283 by 20× from 4× to 24×. Since the award 270t of the 5× multiplier associated with the picked selection 260t has the horizontal stripes pattern, the gaming system provides an additional award of 2 free spins in accordance with the active selection game enhancement 210a and the active selection game enhancement 210c, and increases the sum of the free spin awards displayed in the free spin award meter 281 by 2 free spins from 6 free spins to 8 free spins. The gaming system displays the following message in the message box 280: "YOU PICKED AN AWARD OF A 5× MULTIPLIER, WHICH TWO ACTIVE ENHANCEMENTS INCREASE TO 20×! YOU ALSO WIN 2 FREE SPINS FOR PICKING AN AWARD HAVING THE HORIZONTAL STRIPES PATTERN ACCORDING TO ANOTHER ACTIVE ENHANCEMENT! PICK AGAIN!"

As shown in FIG. 2K, the gaming system receives a pick of the selection 230d of the first set, reveals and activates the selection game enhancement 240d associated with the picked selection 230d, and reduces the player's quantity of picks by one (as shown in the picks remaining meter 284). Here, the picked selection 230d is associated with a selection game enhancement 240d that, when active, causes the gaming system to provide an additional award of 10 free spins if the player accumulates four awards having the dotted pattern during the play of the selection game. Thus, the selection game enhancement 240d is associated with an additional rule for the selection game. The gaming system displays an indication 210d of this (now) active selection game enhancement in the active selection game enhancements display area 210. The gaming system displays the following message in the message box 280: "YOU ACTIVATED AN ENHANCEMENT THAT PROVIDES 10 FREE SPINS IF YOU ACCUMULATE 4 AWARDS HAVING THE DOTTED PATTERN! PICK AGAIN!"

As shown in FIG. 2L, the gaming system receives a pick of the selection 260q of the second set, reveals the associated award 270q of 50 credits having the dotted pattern, and reduces the player's quantity of picks by one (as shown in the picks remaining meter 284). The gaming system doubles the award of 50 credits from 50 credits to 100 credits according to the active selection game enhancement 210b, and then again doubles the award of 100 credits from 100 credits to 200 credits according to the active selection game enhancement 210c. The gaming system increases the quantity of credits displayed in the credit awards meter 282 by 200 credits from 500 credits to 700 credits.

Since the player has no picks remaining, the gaming system determines a total credit award of 16,800 credits for the play of the selection game by multiplying the sum of the credit awards of 700 credits displayed in the credit awards meter 282 by the sum of the multiplier awards of 24× displayed in the multiplier awards meter 283. The gaming system increases the quantity of credits displayed in the credit meter 285 by 16,800 credits from 400 credits to 17,200 credits. The gaming system then provides the 8 free spins. The gaming system displays the following message in the message box 280: "YOU PICKED AN AWARD OF 50 CREDITS, WHICH TWO ACTIVE ENHANCEMENTS INCREASE TO 200 CREDITS! YOU ARE OUT OF PICKS . . . YOU WIN 8 FREE SPINS AND 700 CREDITS @ 24×=16,800 CREDITS!"

In various embodiments, upon initiation of the selection game, the gaming system provides the player a quantity of picks that is greater than a quantity of selections in the first set of one or more selections. Put differently, in these embodiments, the gaming system provides the player more picks that the first set has selections. By doing so, the gaming system ensures that, even if the gaming system receives a pick of each of the one or more selections of the first set, the gaming system will receive a pick of at least one of the one or more selections of the second set and, therefore, the gaming system will provide the player with at least one award for the play of the selection game. Put differently, by doing so, the gaming system guarantees that it will provide the player at least one award during the play of the selection game.

In certain embodiments, all of the awards of the selection game are available to be won by the player upon initiation of a play of the selection game. That is, in these embodiments: (a) the selection game is associated with a quantity of N different awards, wherein N is any suitable number; (b) the second set of selections includes a quantity of N different selections; and (c) each of the N selections of the second set of selections is associated with a different one of the N awards. Thus, in these embodiments, there are exactly N possible awards distributed among N selections upon initiation of the play of the selection game.

In other embodiments, a subset of the awards of the selection game are available to be won by the player upon initiation of a play of the selection game. That is, in these embodiments: (a) the selection game is associated with a quantity of M different awards, wherein M is any suitable number; (b) the second set of selections includes a quantity of N different selections, wherein M is greater than N; and (c) each of the N selections of the second set is associated with a different one of a subset of N of the M awards. Thus, in these embodiments, there are a subset of N possible awards of the total M possible awards distributed among N selections upon initiation of the play of the selection game. It should be appreciated that the awards included in the subset of N possible awards may be determined in any suitable manner.

In certain embodiments, the selection game is associated with a plurality of different sets of awards. In these embodiments, when the gaming system receives a pick of one of the selections of the second set, the gaming system determines an award from one of the sets of awards to provide to the player. In certain such embodiments, the gaming system determines the particular set of awards from which to determine the award associated with a picked selection based, at least in part, on at least one of: (a) the quantity of active selection game enhancements; and (b) which particular selection game enhancements (if any) are active. For instance, in one example embodiment, when the gaming system receives a pick of one of the selections of the second set, the gaming system determines an award from: (a) a first set of awards if zero selection game enhancements are active, (b) a second different set of awards if one selection game enhancement is active, and (c) a third different set of awards if two selection game enhancements are active. In various embodiments, the gaming system does so to ensure that the average expected payback percentage of the selection game is a designated average expected payback percentage regardless of the selections picked by the player.

In certain embodiments, the selection game is associated with a plurality of different sets of enhancements. In these embodiments, when the gaming system receives a pick of one of the selections of the first set, the gaming system determines an enhancement from one of the sets of enhancements to provide to the player. In certain such embodiments, the gaming system determines the particular set of enhancements from which to determine the enhancement associated with a picked selection based, at least in part, on at least one of: (a) the quantity of picked selections of the second set; and (b) the awards associated with any picked selections of the second set. For instance, in one example embodiment, when the gaming system receives a pick of one of the selections of the first set, the gaming system determines an enhancement from: (a) a first set of enhancements if zero selections have been picked from the second set, (b) a second different set of enhancement if one selection has been picked from the second set, and (c) a third different set of enhancements if two selections have been picked from the second set. In various embodiments, the gaming system does so to ensure that the average expected payback percentage of the selection game is a designated average expected payback percentage regardless of the selections picked by the player.

In various embodiments, the gaming system does not enable the player to pick certain of the selections of the second set at least until the gaming system receives a pick of a designated one of the selections of the first set. For instance, in one such example embodiment, the gaming system includes a second set of fifteen symbols divided into a first subset of ten symbols and a second subset of five symbols. In this example embodiment, upon initiation of the selection game, the gaming system enables the player to pick any of the symbols of the first subset of the second set, but does not enable the player to pick any of the symbols of the second subset of the second set. In this example embodiment, if the gaming system receives a pick of a designated selection of the first set, the gaming system unlocks the second subset of the second set, and subsequently enables the player to pick any of the symbols of the second subset of the second set.

In another such example embodiment, the gaming system includes a second set of fifteen symbols divided into a first subset of ten symbols and a second subset of five symbols. In this example embodiment, upon initiation of the selection game, the gaming system enables the player to pick any of the symbols of the first subset of the second set, but does not enable the player to pick any of the symbols of the second subset of the second set. In this example embodiment, if the gaming system receives a pick of a designated selection of the first set, the gaming system modifies at least one of the awards associated with the remaining selections of the first subset of the second set to include a second subset unlock feature. When the gaming system receives a selection of one of the symbols of the first subset of the second set associated with this modified award, the gaming system unlocks the second subset of the second set, and subsequently enables the player to pick any of the symbols of the second subset of the second set.

It should be appreciated that the selection game may include any suitable quantity of unlockable subsets of the second set from which the gaming system does not initially enable the player to pick selections. For instance, in one example embodiment, the gaming system displays the fifteen selections of the second set in the form of a pyramid, including: a first subset of five selections, a second initially locked subset of four selections, a third initially locked subset of three selections, a fourth initially locked subset of two selections, and a fifth initially locked subset of one selection. Thus, in this example embodiment, the selection game is associated with four different unlockable subsets.

In the above-described embodiments, the gaming system identifies which particular selections are associated with awards and which particular selections are associated with selection game enhancements. It should be appreciated that, in other embodiments, the gaming system does not indicate which selections are associated with awards and which selections are associated with selection game enhancements.

In certain embodiments, the gaming system includes an automatic pick option that, if selected by the player, causes the gaming system to automatically use the player's pick(s) to pick selections. In one such embodiment, when the automatic pick option is activated, the gaming system uses the player's picks to randomly pick selections. In another such embodiment, if the automatic pick option is activated, the gaming system uses the player's picks to pick selection according to one or more rules set by the player.

In various embodiments, the gaming system requires the player to pick selections according to a designated order. For instance, in one example embodiment, the gaming system requires the player to first pick any desired selection from the first set (i.e., the set associated with the selection game enhancements), and subsequently requires the player to use any remaining picks on selections of the second set. Thus, in this example embodiment, the gaming system ensures that any active selection game enhancements are active before any awards are picked. In another example embodiment, the gaming system requires the player to alternate picking selections in the first and second sets. It should be appreciated that the gaming system may employ any suitable designated order in such embodiments.

It should be appreciated that:
(a) the triggering event that causes the gaming system to initiate a play of the selection game;
(b) the initial quantity of picks the gaming system provides the player;
(c) the quantity of selections in the first set;
(d) the quantity of selections in the second set;
(e) the particular activatable selection game enhancements associated with the selections of the first set;
(f) the particular awards associated with the selections of the second set;
(g) the particular characteristic(s) (if any) associated with the awards;
(h) the particular characteristic(s) (if any) associated with the selection game enhancements; and/or
(i) any other variables and determinations described herein may be: (1) predetermined; (2) randomly determined; (3) randomly determined based on one or more weighted percentages (such as according to a weighted table); (4) determined based on a generated symbol or symbol combination; (5) determined independent of a generated symbol or symbol combination; (6) determined based on a random determination by a central controller (described below); (7) determined independent of a random determination by the central controller; (8) determined based on a random determination at an EGM; (9) determined independent of a random determination at the EGM; (10) determined based on at least one play of at least one game; (11) determined independent of at least one play of at least one game; (12) determined based on a player's selection; (13) determined independent of a player's selection; (14) determined based on one or more side wagers placed; (15) determined independent of one or more side wagers placed; (16) determined based on the player's primary game wager or wager level; (17) determined independent of the player's primary game wager or wager level; (18) determined based on time (such as the time of day); (19) determined independent of time (such as the time of day); (20) determined based on an amount of coin-in accumulated in one or more pools; (21) determined independent of an amount of coin-in accumulated in one or more pools; (22) determined based on a status of the player (i.e., a player tracking status); (23) determined independent of a status of the player (i.e., a player tracking status); (24) determined based on one or more other determinations disclosed herein; (25) determined independent of any other determination disclosed herein; and/or (26) determined in any other suitable manner or based on or independent of any other suitable factor(s).

Gaming Systems

It should be appreciated that the above-described embodiments of the present disclosure may be implemented in accordance with or in conjunction with one or more of a variety of different types of gaming systems, such as, but not limited to, those described below.

The present disclosure contemplates a variety of different gaming systems each having one or more of a plurality of different features, attributes, or characteristics. It should be appreciated that a "gaming system" as used herein refers to various configurations of: (a) one or more central servers, central controllers, or remote hosts; (b) one or more EGMs; and/or (c) one or more personal gaming devices, such as desktop computers, laptop computers, tablet computers or computing devices, personal digital assistants (PDAs), mobile telephones such as smart phones, and other mobile computing devices.

Thus, in various embodiments, the gaming system of the present disclosure includes: (a) one or more EGMs in combination with one or more central servers, central controllers, or remote hosts; (b) one or more personal gaming devices in combination with one or more central servers, central controllers, or remote hosts; (c) one or more personal gaming devices in combination with one or more EGMs; (d) one or more personal gaming devices, one or more EGMs, and one or more central servers, central controllers, or remote hosts in combination with one another; (e) a single EGM; (f) a plurality of EGMs in combination with one another; (g) a single personal gaming device; (h) a plurality of personal gaming devices in combination with one another; (i) a single central server, central controller, or remote host; and/or (j) a plurality of central servers, central controllers, or remote hosts in combination with one another.

For brevity and clarity, each EGM and each personal gaming device of the present disclosure is collectively referred to herein as an "EGM." Additionally, for brevity and clarity, unless specifically stated otherwise, "EGM" as used herein represents one EGM or a plurality of EGMs, and "central server, central controller, or remote host" as used herein represents one central server, central controller, or remote host or a plurality of central servers, central controllers, or remote hosts.

Figure 3A:
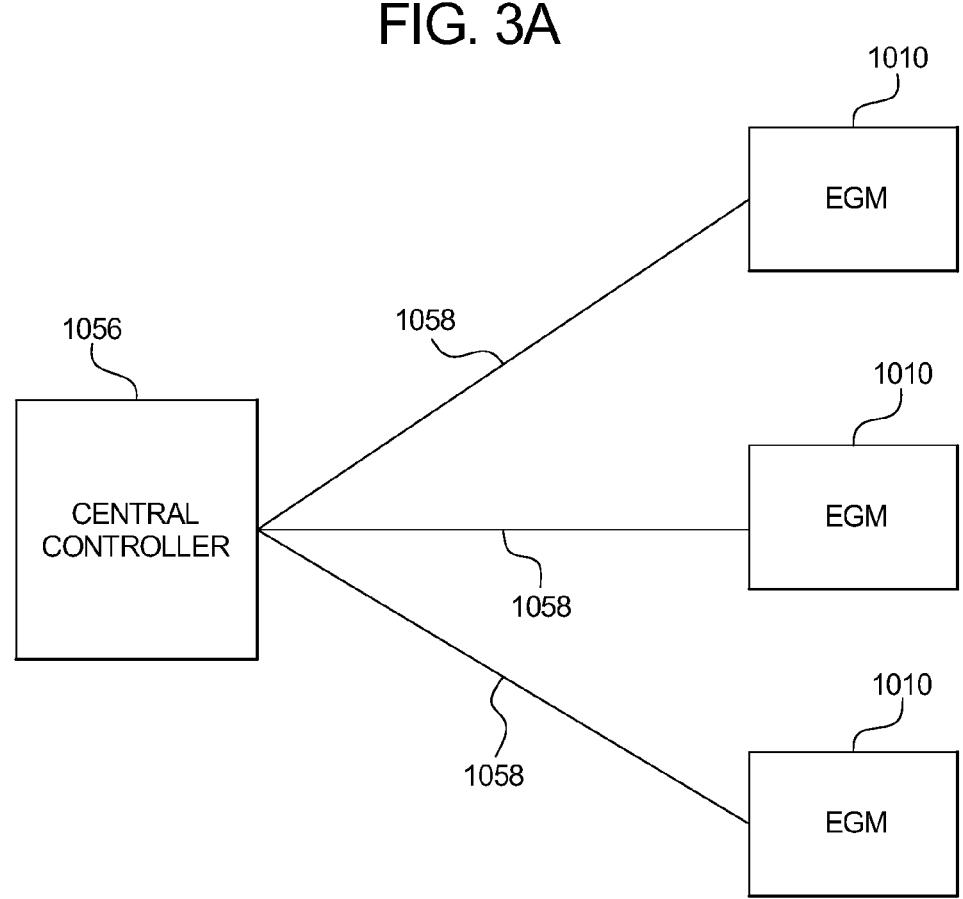
FIG. 3A is a schematic block diagram of one embodiment of a network configuration of the gaming system of the present disclosure.

As noted above, in various embodiments, the gaming system includes an EGM in combination with a central server, central controller, or remote host. In such embodiments, the EGM is configured to communicate with the central server, central controller, or remote host through a data network or remote communication link. In certain such embodiments, the EGM is configured to communicate with another EGM through the same data network or remote communication link or through a different data network or remote communication link. For example, the gaming system illustrated in FIG. 3A includes a plurality of EGMs 1010 that are each configured to communicate with a central server, central controller, or remote host 1056 through a data network 1058.

In certain embodiments in which the gaming system includes an EGM in combination with a central server, central controller, or remote host, the central server, central controller, or remote host is any suitable computing device (such as a server) that includes at least one processor and at least one memory device or storage device. As further described herein, the EGM includes at least one EGM processor configured to transmit and receive data or signals representing events, messages, commands, or any other suitable information between the EGM and the central server, central controller, or remote host. The at least one processor of that EGM is configured to execute the events, messages, or commands represented by such data or signals in conjunction with the operation of the EGM. Moreover, the at least one processor of the central server, central controller, or remote host is configured to transmit and receive data or signals representing events, messages, commands, or any other suitable information between the central server, central controller, or remote host and the EGM. The at least one processor of the central server, central controller, or remote host is configured to execute the events, messages, or commands represented by such data or signals in conjunction with the operation of the central server, central controller, or remote host. It should be appreciated that one, more, or each of the functions of the central server, central controller, or remote host may be performed by the at least one processor of the EGM. It should be further appreciated that one, more, or each of the functions of the at least one processor of the EGM may be performed by the at least one processor of the central server, central controller, or remote host.

In certain such embodiments, computerized instructions for controlling any games (such as any primary or base games and/or any secondary or bonus games) displayed by the EGM are executed by the central server, central controller, or remote host. In such "thin client" embodiments, the central server, central controller, or remote host remotely controls any games (or other suitable interfaces) displayed by the EGM, and the EGM is utilized to display such games (or suitable interfaces) and to receive one or more inputs or commands. In other such embodiments, computerized instructions for controlling any games displayed by the EGM are communicated from the central server, central controller, or remote host to the EGM and are stored in at least one memory device of the EGM. In such "thick client" embodiments, the at least one processor of the EGM executes the computerized instructions to control any games (or other suitable interfaces) displayed by the EGM.

In various embodiments in which the gaming system includes a plurality of EGMs, one or more of the EGMs are thin client EGMs and one or more of the EGMs are thick client EGMs. In other embodiments in which the gaming system includes one or more EGMs, certain functions of one or more of the EGMs are implemented in a thin client environment, and certain other functions of one or more of the EGMs are implemented in a thick client environment. In one such embodiment in which the gaming system includes an EGM and a central server, central controller, or remote host, computerized instructions for controlling any primary or base games displayed by the EGM are communicated from the central server, central controller, or remote host to the EGM in a thick client configuration, and computerized instructions for controlling any secondary or bonus games or other functions displayed by the EGM are executed by the central server, central controller, or remote host in a thin client configuration.

In certain embodiments in which the gaming system includes: (a) an EGM configured to communicate with a central server, central controller, or remote host through a data network; and/or (b) a plurality of EGMs configured to communicate with one another through a data network, the data network is a local area network (LAN) in which the EGMs are located substantially proximate to one another and/or the central server, central controller, or remote host. In one example, the EGMs and the central server, central controller, or remote host are located in a gaming establishment or a portion of a gaming establishment.

In other embodiments in which the gaming system includes: (a) an EGM configured to communicate with a central server, central controller, or remote host through a data network; and/or (b) a plurality of EGMs configured to communicate with one another through a data network, the data network is a wide area network (WAN) in which one or more of the EGMs are not necessarily located substantially proximate to another one of the EGMs and/or the central server, central controller, or remote host. For example, one or more of the EGMs are located: (a) in an area of a gaming establishment different from an area of the gaming establishment in which the central server, central controller, or remote host is located; or (b) in a gaming establishment different from the gaming establishment in which the central server, central controller, or remote host is located. In another example, the central server, central controller, or remote host is not located within a gaming establishment in which the EGMs are located. It should be appreciated that in certain embodiments in which the data network is a WAN, the gaming system includes a central server, central controller, or remote host and an EGM each located in a different gaming establishment in a same geographic area, such as a same city or a same state. It should be appreciated that gaming systems in which the data network is a WAN are substantially identical to gaming systems in which the data network is a LAN, though the quantity of EGMs in such gaming systems may vary relative to one another.

In further embodiments in which the gaming system includes: (a) an EGM configured to communicate with a central server, central controller, or remote host through a data network; and/or (b) a plurality of EGMs configured to communicate with one another through a data network, the data network is an internet or an intranet. In certain such embodiments, an internet browser of the EGM is usable to access an internet game page from any location where an internet connection is available. In one such embodiment, after the internet game page is accessed, the central server, central controller, or remote host identifies a player prior to enabling that player to place any wagers on any plays of any wagering games. In one example, the central server, central controller, or remote host identifies the player by requiring a player account of the player to be logged into via an input of a unique username and password combination assigned to the player. It should be appreciated, however, that the central server, central controller, or remote host may identify the player in any other suitable manner, such as by validating a player tracking identification number associated with the player; by reading a player tracking card or other smart card inserted into a card reader (as described below); by validating a unique player identification number associated with the player by the central server, central controller, or remote host; or by identifying the EGM, such as by identifying the MAC address or the IP address of the internet facilitator. In various embodiments, once the central server, central controller, or remote host identifies the player, the central server, central controller, or remote host enables placement of one or more wagers on one or more plays of one or more primary or base games and/or one or more secondary or bonus games, and displays those plays via the internet browser of the EGM.

It should be appreciated that the central server, central controller, or remote host and the EGM are configured to connect to the data network or remote communications link in any suitable manner. In various embodiments, such a connection is accomplished via: a conventional phone line or other data transmission line, a digital subscriber line (DSL), a T-1 line, a coaxial cable, a fiber optic cable, a wireless or wired routing device, a mobile communications network connection (such as a cellular network or mobile internet network), or any other suitable medium. It should be appreciated that the expansion in the quantity of computing devices and the quantity and speed of internet connections in recent years increases opportunities for players to use a variety of EGMs to play games from an ever-increasing quantity of remote sites. It should also be appreciated that the enhanced bandwidth of digital wireless communications may render such technology suitable for some or all communications, particularly if such communications are encrypted. Higher data transmission speeds may be useful for enhancing the sophistication and response of the display and interaction with players.

EGM Components

Figure 3B:
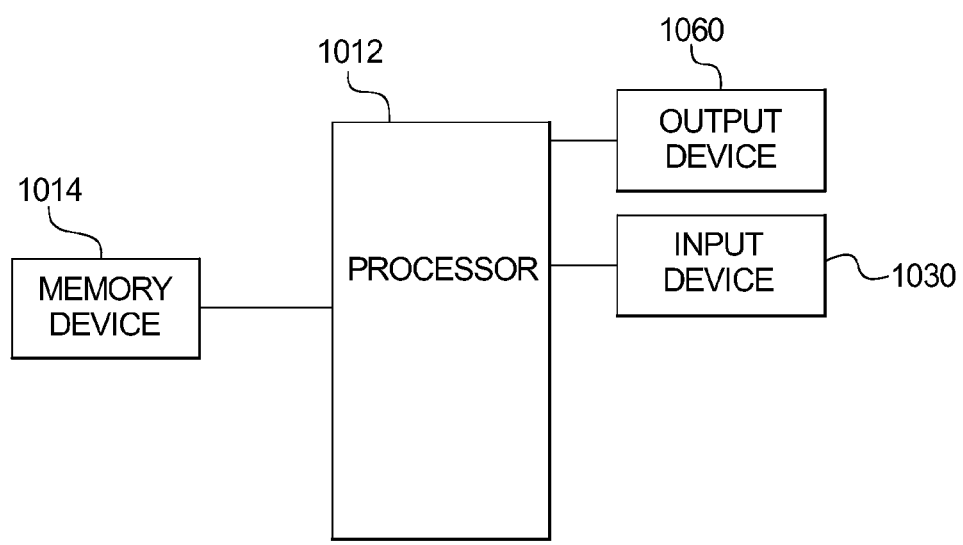
FIG. 3B is a schematic block diagram of an example electronic configuration of the gaming system of the present disclosure.

In various embodiments, an EGM includes at least one processor configured to operate with at least one memory device, at least one input device, and at least one output device. The at least one processor may be any suitable processing device or set of processing devices, such as a microprocessor, a microcontroller-based platform, a suitable integrated circuit, or one or more application-specific integrated circuits (ASICs). FIG. 3B illustrates an example EGM including a processor 1012.

As generally noted above, the at least one processor of the EGM is configured to communicate with, configured to access, and configured to exchange signals with at least one memory device or data storage device. In various embodiments, the at least one memory device of the EGM includes random access memory (RAM), which can include non-volatile RAM (NVRAM), magnetic RAM (MRAM), ferro-electric RAM (FeRAM), and other forms as commonly understood in the gaming industry. In other embodiments, the at least one memory device includes read only memory (ROM). In certain embodiments, the at least one memory device of the EGM includes flash memory and/or EEPROM (electrically erasable programmable read only memory). The example EGM illustrated in FIG. 3B includes a memory device 1014. It should be appreciated that any other suitable magnetic, optical, and/or semiconductor memory may operate in conjunction with the EGM disclosed herein. In certain embodiments, the at least one processor of the EGM and the at least one memory device of the EGM both reside within a cabinet of the EGM (as described below). In other embodiments, at least one of the at least one processor of the EGM and the at least one memory device of the EGM reside outside the cabinet of the EGM (as described below).

In certain embodiments, as generally described above, the at least one memory device of the EGM stores program code and instructions executable by the at least one processor of the EGM to control the EGM. The at least one memory device of the EGM also stores other operating data, such as image data, event data, input data, random number generators (RNGs) or pseudo-RNGs, paytable data or information, and/or applicable game rules that relate to the play of one or more games on the EGM (such as primary or base games and/or secondary or bonus games as described below). In various embodiments, part or all of the program code and/or the operating data described above is stored in at least one detachable or removable memory device including, but not limited to, a cartridge, a disk, a CD ROM, a DVD, a USB memory device, or any other suitable non-transitory computer readable medium. In certain such embodiments, an operator (such as a gaming establishment operator) and/or a player uses such a removable memory device in an EGM to implement at least part of the present disclosure. In other embodiments, part or all of the program code and/or the operating data is downloaded to the at least one memory device of the EGM through any suitable data network described above (such as an internet or intranet).

Figure 4A:
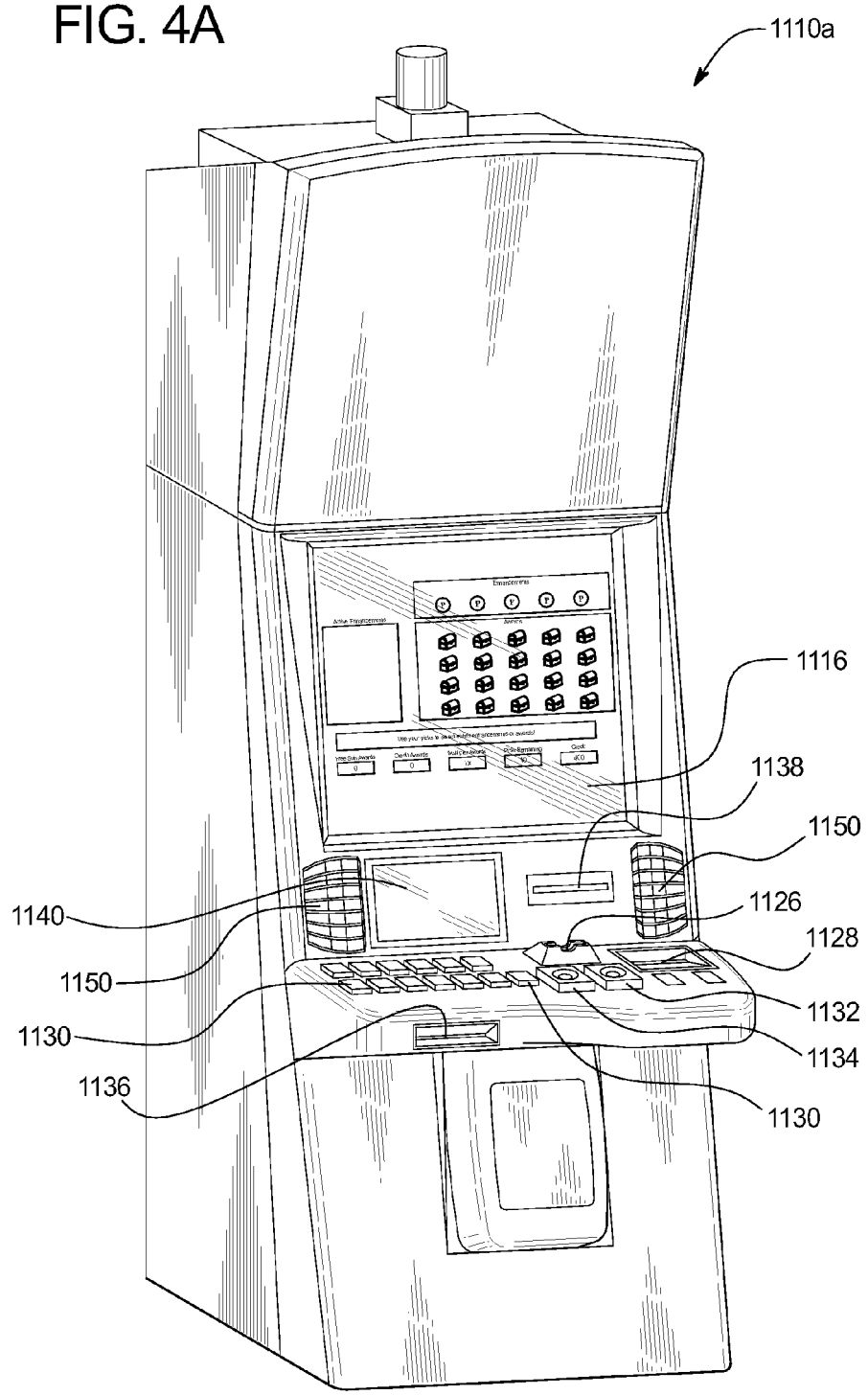
FIGS. 4A and 4B are perspective views of example alternative embodiments of the gaming system of the present disclosure.
Figure 4B:
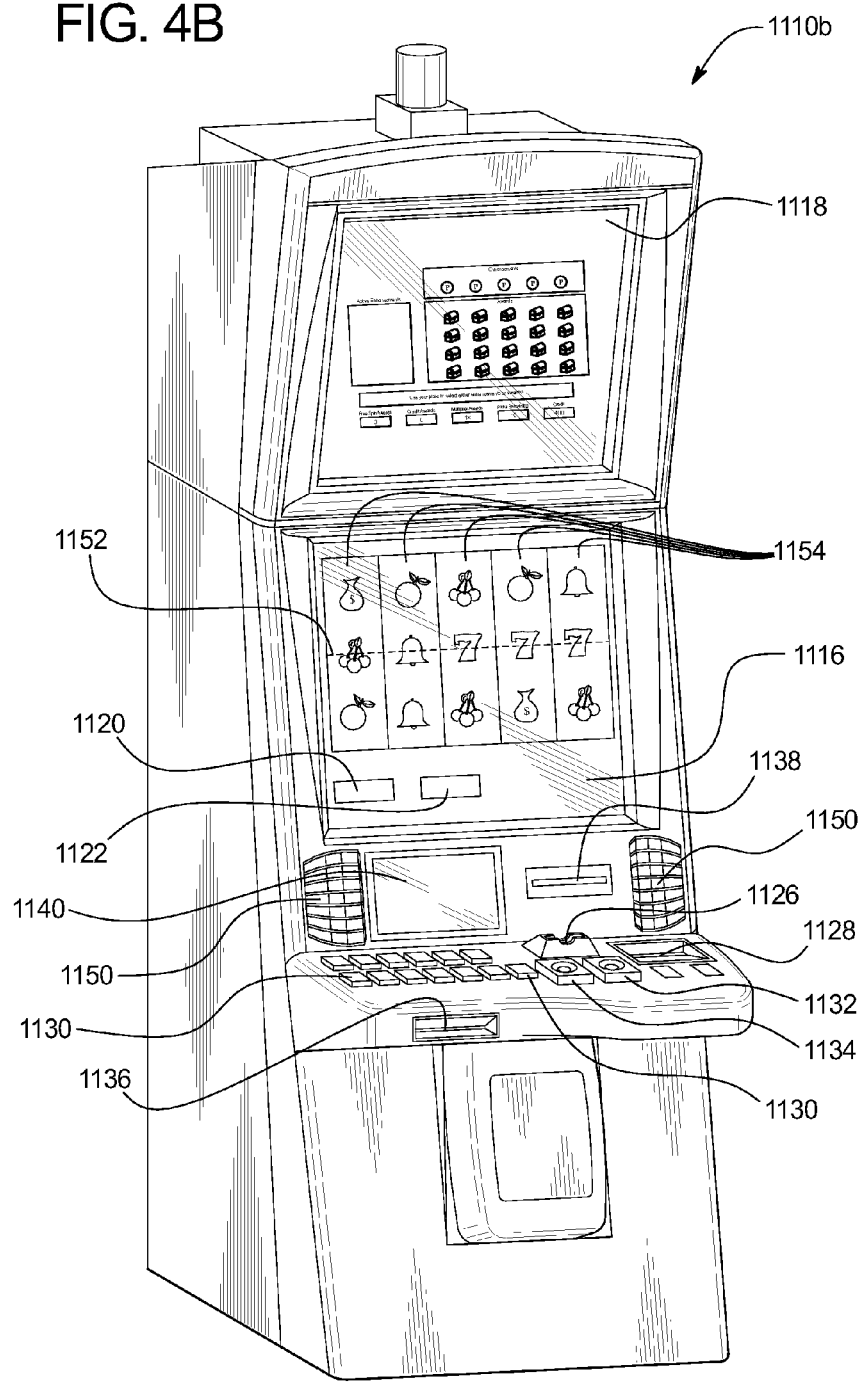

In various embodiments, the EGM includes one or more input devices. The input devices may include any suitable device that enables an input signal to be produced and received by the at least one processor of the EGM. The example EGM illustrated in FIG. 3B includes at least one input device 1030. One input device of the EGM is a payment device configured to communicate with the at least one processor of the EGM to fund the EGM. In certain embodiments, the payment device includes one or more of: (a) a bill acceptor into which paper money is inserted to fund the EGM; (b) a ticket acceptor into which a ticket or a voucher is inserted to fund the EGM; (c) a coin slot into which coins or tokens are inserted to fund the EGM; (d) a reader or a validator for credit cards, debit cards, or credit slips into which a credit card, debit card, or credit slip is inserted to fund the EGM; (e) a player identification card reader into which a player identification card is inserted to fund the EGM; or (f) any suitable combination thereof. FIGS. 4A and 4B illustrate example EGMs 1110a and 1110b that each include the following payment devices: (a) a combined bill and ticket acceptor 1128, and (b) a coin slot 1126.

In one embodiment, the EGM includes a payment device configured to enable the EGM to be funded via an electronic funds transfer, such as a transfer of funds from a bank account. In another embodiment, the EGM includes a payment device configured to communicate with a mobile device of a player, such as a cell phone, a radio frequency identification tag, or any other suitable wired or wireless device, to retrieve relevant information associated with that player to fund the EGM. It should be appreciated that when the EGM is funded, the at least one processor determines the amount of funds entered and displays the corresponding amount on a credit display or any other suitable display as described below.

In various embodiments, one or more input devices of the EGM are one or more game play activation devices that are each used to initiate a play of a game on the EGM or a sequence of events associated with the EGM following appropriate funding of the EGM. The example EGMs 1110a and 1110b illustrated in FIGS. 4A and 4B each include a game play activation device in the form of a game play initiation button 1132. It should be appreciated that, in other embodiments, the EGM begins game play automatically upon appropriate funding rather than upon utilization of the game play activation device.

In certain embodiments, one or more input devices of the EGM are one or more wagering or betting devices. One such wagering or betting device is as a maximum wagering or betting device that, when utilized, causes a maximum wager to be placed. Another such wagering or betting device is a repeat the bet device that, when utilized, causes the previously-placed wager to be placed. A further such wagering or betting device is a bet one device. A bet is placed upon utilization of the bet one device. The bet is increased by one credit each time the bet one device is utilized. Upon the utilization of the bet one device, a quantity of credits shown in a credit display (as described below) decreases by one, and a number of credits shown in a bet display (as described below) increases by one. The example EGMs 1110a and 1110b illustrated in FIGS. 4A and 4B each include one or more input devices 1130.

In other embodiments, one input device of the EGM is a cash out device. The cash out device is utilized to receive a cash payment or any other suitable form of payment corresponding to a quantity of remaining credits of a credit display (as described below). The example EGMs illustrated in FIGS. 4A and 4B each include a cash out device in the form of a cash out button 1134.

In certain embodiments, one input device of the EGM is a touch-screen coupled to a touch-screen controller or other touch-sensitive display overlay to enable interaction with any images displayed on a display device (as described below). One such input device is a conventional touch-screen button panel. The touch-screen and the touch-screen controller are connected to a video controller. In these embodiments, signals are input to the EGM by touching the touch screen at the appropriate locations.

In various embodiments, one input device of the EGM is a sensor, such as a camera, in communication with the at least one processor of the EGM (and controlled by the at least one processor of the EGM in some embodiments) and configured to acquire an image or a video of a player using the EGM and/or an image or a video of an area surrounding the EGM.

In embodiments including a player tracking system, as further described below, one input device of the EGM is a card reader in communication with the at least one processor of the EGM. The example EGMs 1110*a* and 1110*b* illustrated in FIGS. 4A and 4B each include a card reader 1138. The card reader is configured to read a player identification card inserted into the card reader.

In various embodiments, the EGM includes one or more output devices. The example EGM illustrated in FIG. 3B includes at least one output device 1060. One or more output devices of the EGM are one or more display devices configured to display any game(s) displayed by the EGM and any suitable information associated with such game(s). In certain embodiments, the display devices are connected to or mounted on a cabinet of the EGM (as described below). In various embodiments, the display devices serves as digital glass configured to advertise certain games or other aspects of the gaming establishment in which the EGM is located. In various embodiments, the EGM includes one or more of the following display devices: (a) a central display device; (b) a player tracking display configured to display various information regarding a player's player tracking status (as described below); (c) a secondary or upper display device in addition to the central display device and the player tracking display; (d) a credit display configured to display a current quantity of credits, amount of cash, account balance, or the equivalent; and (e) a bet display configured to display an amount wagered for one or more plays of one or more games. The example EGM 1110*a* illustrated in FIG. 4A includes a central display device 1116, a player tracking display 1140, a credit display 1120, and a bet display 1122. The example EGM 1110*b* illustrated in FIG. 4B includes a central display device 1116, an upper display device 1118, a player tracking display 1140, a credit display 1120, and a bet display 1122.

In various embodiments, the display devices include, without limitation: a monitor, a television display, a plasma display, a liquid crystal display (LCD), a display based on light emitting diodes (LEDs), a display based on a plurality of organic light-emitting diodes (OLEDs), a display based on polymer light-emitting diodes (PLEDs), a display based on a plurality of surface-conduction electron-emitters (SEDs), a display including a projected and/or reflected image, or any other suitable electronic device or display mechanism. In certain embodiments, as described above, the display device includes a touch-screen with an associated touch-screen controller. It should be appreciated that the display devices may be of any suitable sizes, shapes, and configurations.

The display devices of the EGM are configured to display one or more game and/or non-game images, symbols, and indicia. In certain embodiments, the display devices of the EGM are configured to display any suitable visual representation or exhibition of the movement of objects; dynamic lighting; video images; images of people, characters, places, things, and faces of cards; and the like. In certain embodiments, the display devices of the EGM are configured to display one or more video reels, one or more video wheels, and/or one or more video dice. In other embodiments, certain of the displayed images, symbols, and indicia are in mechanical form. That is, in these embodiments, the display device includes any electromechanical device, such as one or more rotatable wheels, one or more reels, and/or one or more dice, configured to display at least one or a plurality of game or other suitable images, symbols, or indicia.

In various embodiments, one output device of the EGM is a payout device. In these embodiments, when the cash out device is utilized as described above, the payout device causes a payout to be provided to the player. In one embodiment, the payout device is one or more of: (a) a ticket generator configured to generate and provide a ticket or credit slip representing a payout, wherein the ticket or credit slip may be redeemed via a cashier, a kiosk, or other suitable redemption system; (b) a note generator configured to provide paper currency; (c) a coin generator configured to provide coins or tokens in a coin payout tray; and (d) any suitable combination thereof. The example EGMs 1110*a* and 1110*b* illustrated in FIGS. 4A and 4B each include ticket generator 1136. In one embodiment, the EGM includes a payout device configured to fund an electronically recordable identification card or smart card or a bank account via an electronic funds transfer.

In certain embodiments, one output device of the EGM is a sound generating device controlled by one or more sound cards. In one such embodiment, the sound generating device includes one or more speakers or other sound generating hardware and/or software for generating sounds, such as by playing music for any games or by playing music for other modes of the EGM, such as an attract mode. The example EGMs 1110*a* and 1110*b* illustrated in FIGS. 4A and 4B each include a plurality of speakers 1150. In another such embodiment, the EGM provides dynamic sounds coupled with attractive multimedia images displayed on one or more of the display devices to provide an audio-visual representation or to otherwise display full-motion video with sound to attract players to the EGM. In certain embodiments, the EGM displays a sequence of audio and/or visual attraction messages during idle periods to attract potential players to the EGM. The videos may be customized to provide any appropriate information.

In various embodiments, the EGM includes a plurality of communication ports configured to enable the at least one processor of the EGM to communicate with and to operate with external peripherals, such as: accelerometers, arcade sticks, bar code readers, bill validators, biometric input devices, bonus devices, button panels, card readers, coin dispensers, coin hoppers, display screens or other displays or video sources, expansion buses, information panels, keypads, lights, mass storage devices, microphones, motion sensors, motors, printers, reels, SCSI ports, solenoids, speakers, thumbsticks, ticket readers, touch screens, trackballs, touchpads, wheels, and wireless communication devices. At least U.S. Patent Application Publication No. 2004/0254014 describes a variety of EGMs including one or more communication ports that enable the EGMs to communicate and operate with one or more external peripherals.

As generally described above, in certain embodiments, such as the example EGMs 1110*a* and 1110*b* illustrated in FIGS. 4A and 4B, the EGM has a support structure, housing, or cabinet that provides support for a plurality of the input device and the output devices of the EGM. Further, the EGM is configured such that a player may operate it while standing or sitting. In various embodiments, the EGM is positioned on a base or stand, or is configured as a pub-style tabletop game (not shown) that a player may operate typically while sitting. As illustrated by the different example EGMs 1110a and 1110b shown in FIGS. 4A and 4B, EGMs may have varying cabinet and display configurations.

It should be appreciated that, in certain embodiments, the EGM is a device that has obtained approval from a regulatory gaming commission, and in other embodiments, the EGM is a device that has not obtained approval from a regulatory gaming commission.

As explained above, for brevity and clarity, both the EGMs and the personal gaming devices of the present disclosure are collectively referred to herein as "EGMs." Accordingly, it should be appreciated that certain of the example EGMs described above include certain elements that may not be included in all EGMs. For example, the payment device of a personal gaming device such as a mobile telephone may not include a coin acceptor, while in certain instances the payment device of an EGM located in a gaming establishment may include a coin acceptor.

Operation of Primary or Base Games and/or Secondary or Bonus Games

In various embodiments, an EGM may be implemented in one of a variety of different configurations. In various embodiments, the EGM may be implemented as one of: (a) a dedicated EGM wherein computerized game programs executable by the EGM for controlling any primary or base games (referred to herein as "primary games") and/or any secondary or bonus games or other functions (referred to herein as "secondary games") displayed by the EGM are provided with the EGM prior to delivery to a gaming establishment or prior to being provided to a player; and (b) a changeable EGM wherein computerized game programs executable by the EGM for controlling any primary games and/or secondary games displayed by the EGM are downloadable to the EGM through a data network or remote communication link after the EGM is physically located in a gaming establishment or after the EGM is provided to a player.

As generally explained above, in various embodiments in which the gaming system includes a central server, central controller, or remote host and a changeable EGM, the at least one memory device of the central server, central controller, or remote host stores different game programs and instructions executable by the at least one processor of the changeable EGM to control one or more primary games and/or secondary games displayed by the changeable EGM. More specifically, each such executable game program represents a different game or a different type of game that the at least one changeable EGM is configured to operate. In one example, certain of the game programs are executable by the changeable EGM to operate games having the same or substantially the same game play but different paytables. In different embodiments, each executable game program is associated with a primary game, a secondary game, or both. In certain embodiments, an executable game program is executable by the at least one processor of the at least one changeable EGM as a secondary game to be played simultaneously with a play of a primary game (which may be downloaded to or otherwise stored on the at least one changeable EGM), or vice versa.

In operation of such embodiments, the central server, central controller, or remote host is configured to communicate one or more of the stored executable game programs to the at least one processor of the changeable EGM. In different embodiments, a stored executable game program is communicated or delivered to the at least one processor of the changeable EGM by: (a) embedding the executable game program in a device or a component (such as a microchip to be inserted into the changeable EGM); (b) writing the executable game program onto a disc or other media; or (c) uploading or streaming the executable game program over a data network (such as a dedicated data network). After the executable game program is communicated from the central server, central controller, or remote host to the changeable EGM, the at least one processor of the changeable EGM executes the executable game program to enable the primary game and/or the secondary game associated with that executable game program to be played using the display device(s) and/or the input device(s) of the changeable EGM. That is, when an executable game program is communicated to the at least one processor of the changeable EGM, the at least one processor of the changeable EGM changes the game or the type of game that may be played using the changeable EGM.

In certain embodiments, the gaming system randomly determines any game outcome(s) (such as a win outcome) and/or award(s) (such as a quantity of credits to award for the win outcome) for a play of a primary game and/or a play of a secondary game based on probability data. In certain such embodiments, this random determination is provided through utilization of an RNG, such as a true RNG or a pseudo RNG, or any other suitable randomization process. In one such embodiment, each game outcome or award is associated with a probability, and the gaming system generates the game outcome(s) and/or the award(s) to be provided based on the associated probabilities. In these embodiments, since the gaming system generates game outcomes and/or awards randomly or based on one or more probability calculations, there is no certainty that the gaming system will ever provide any specific game outcome and/or award.

In certain embodiments, the gaming system maintains one or more predetermined pools or sets of predetermined game outcomes and/or awards. In certain such embodiments, upon generation or receipt of a game outcome and/or award request, the gaming system independently selects one of the predetermined game outcomes and/or awards from the one or more pools or sets. The gaming system flags or marks the selected game outcome and/or award as used. Once a game outcome or an award is flagged as used, it is prevented from further selection from its respective pool or set; that is, the gaming system does not select that game outcome or award upon another game outcome and/or award request. The gaming system provides the selected game outcome and/or award. At least U.S. Pat. Nos. 7,470,183; 7,563,163; and 7,833,092 and U.S. Patent Application Publication Nos. 2005/0148382, 2006/0094509, and 2009/0181743 describe various examples of this type of award determination.

In certain embodiments, the gaming system determines a predetermined game outcome and/or award based on the results of a bingo, keno, or lottery game. In certain such embodiments, the gaming system utilizes one or more bingo, keno, or lottery games to determine the predetermined game outcome and/or award provided for a primary game and/or a secondary game. The gaming system is provided or associated with a bingo card. Each bingo card consists of a matrix or array of elements, wherein each element is designated with separate indicia. After a bingo card is provided, the gaming system randomly selects or draws a plurality of the elements. As each element is selected, a determination is made as to whether the selected element is present on the bingo card. If the selected element is present on the bingo card, that selected element on the provided bingo card is marked or flagged. This process of selecting elements and marking any selected elements on the provided bingo cards continues until one or more predetermined patterns are marked on one or more of the provided bingo cards. After one or more predetermined patterns are marked on one or more of the provided bingo cards, game outcome and/or award is determined based, at least in part, on the selected elements on the provided bingo cards. At least U.S. Pat. Nos. 7,753,774; 7,731,581; 7,955,170; and 8,070,579 and U.S. Patent Application Publication No. 2011/0028201 describe various examples of this type of award determination.

In certain embodiments in which the gaming system includes a central server, central controller, or remote host and an EGM, the EGM is configured to communicate with the central server, central controller, or remote host for monitoring purposes only. In such embodiments, the EGM determines the game outcome(s) and/or award(s) to be provided in any of the manners described above, and the central server, central controller, or remote host monitors the activities and events occurring on the EGM. In one such embodiment, the gaming system includes a real-time or online accounting and gaming information system configured to communicate with the central server, central controller, or remote host. In this embodiment, the accounting and gaming information system includes: (a) a player database for storing player profiles, (b) a player tracking module for tracking players (as described below), and (c) a credit system for providing automated transactions. At least U.S. Pat. No. 6,913,534 and U.S. Patent Application Publication No. 2006/0281541 describe various examples of such accounting systems.

As noted above, in various embodiments, the gaming system includes one or more executable game programs executable by at least one processor of the gaming system to provide one or more primary games and one or more secondary games. The primary game(s) and the secondary game(s) may comprise any suitable games and/or wagering games, such as, but not limited to: electro-mechanical or video slot or spinning reel type games; video card games such as video draw poker, multi-hand video draw poker, other video poker games, video blackjack games, and video baccarat games; video keno games; video bingo games; and video selection games.

In certain embodiments in which the primary game is a slot or spinning reel type game, the gaming system includes one or more reels in either an electromechanical form with mechanical rotating reels or in a video form with simulated reels and movement thereof. Each reel displays a plurality of indicia or symbols, such as bells, hearts, fruits, numbers, letters, bars, or other images that typically correspond to a theme associated with the gaming system. In certain such embodiments, the gaming system includes one or more paylines associated with the reels. The example EGM 1110b shown in FIG. 4B includes a payline 1152 and a plurality of reels 1154. In certain embodiments, one or more of the reels are independent reels or unisymbol reels. In such embodiments, each independent reel generates and displays one symbol.

In various embodiments, one or more of the paylines is horizontal, vertical, circular, diagonal, angled, or any suitable combination thereof. In other embodiments, each of one or more of the paylines is associated with a plurality of adjacent symbol display areas on a requisite number of adjacent reels. In one such embodiment, one or more paylines are formed between at least two symbol display areas that are adjacent to each other by either sharing a common side or sharing a common corner (i.e., such paylines are connected paylines). The gaming system enables a wager to be placed on one or more of such paylines to activate such paylines. In other embodiments in which one or more paylines are formed between at least two adjacent symbol display areas, the gaming system enables a wager to be placed on a plurality of symbol display areas, which activates those symbol display areas.

In various embodiments, the gaming system provides one or more awards after a spin of the reels when specified types and/or configurations of the indicia or symbols on the reels occur on an active payline or otherwise occur in a winning pattern, occur on the requisite number of adjacent reels, and/or occur in a scatter pay arrangement.

In certain embodiments, the gaming system employs a ways to win award determination. In these embodiments, any outcome to be provided is determined based on a number of associated symbols that are generated in active symbol display areas on the requisite number of adjacent reels (i.e., not on paylines passing through any displayed winning symbol combinations). If a winning symbol combination is generated on the reels, one award for that occurrence of the generated winning symbol combination is provided. At least U.S. Pat. No. 8,012,011 and U.S. Patent Application Publication Nos. 2008/0108408 and 2008/0132320 describe various examples of ways to win award determinations.

In various embodiments, the gaming system includes a progressive award. Typically, a progressive award includes an initial amount and an additional amount funded through a portion of each wager placed to initiate a play of a primary game. When one or more triggering events occurs, the gaming system provides at least a portion of the progressive award. After the gaming system provides the progressive award, an amount of the progressive award is reset to the initial amount and a portion of each subsequent wager is allocated to the next progressive award. At least U.S. Pat. Nos. 5,766,079; 7,585,223; 7,651,392; 7,666,093; 7,780,523; and 7,905,778 and U.S. Patent Application Publication Nos. 2008/0020846, 2009/0123364, 2009/0123363, and 2010/0227677 describe various examples of different progressive gaming systems.

As generally noted above, in addition to providing winning credits or other awards for one or more plays of the primary game(s), in various embodiments the gaming system provides credits or other awards for one or more plays of one or more secondary games. The secondary game typically enables an award to be obtained addition to any award obtained through play of the primary game(s). The secondary game(s) typically produces a higher level of player excitement than the primary game(s) because the secondary game(s) provides a greater expectation of winning than the primary game(s) and is accompanied with more attractive or unusual features than the primary game(s). It should be appreciated that the secondary game(s) may be any type of suitable game, either similar to or completely different from the primary game.

In various embodiments, the gaming system automatically provides or initiates the secondary game upon the occurrence of a triggering event or the satisfaction of a qualifying condition. In other embodiments, the gaming system initiates the secondary game upon the occurrence of the triggering event or the satisfaction of the qualifying condition and upon receipt of an initiation input. In certain embodiments, the triggering event or qualifying condition is a selected outcome in the primary game(s) or a particular arrangement of one or more indicia on a display device for a play of the primary game(s), such as a "BONUS" symbol appearing on three adjacent reels along a payline following a spin of the reels for a play of the primary game. In other embodiments, the triggering event or qualifying condition occurs based on a certain amount of game play (such as number of games, number of credits, amount of time) being exceeded, or based on a specified number of points being earned during game play. It should be appreciated that any suitable triggering event or qualifying condition or any suitable combination of a plurality of different triggering events or qualifying conditions may be employed.

In other embodiments, at least one processor of the gaming system randomly determines when to provide one or more plays of one or more secondary games. In one such embodiment, no apparent reason is provided for the providing of the secondary game. In this embodiment, qualifying for a secondary game is not triggered by the occurrence of an event in any primary game or based specifically on any of the plays of any primary game. That is, qualification is provided without any explanation or, alternatively, with a simple explanation. In another such embodiment, the gaming system determines qualification for a secondary game at least partially based on a game triggered or symbol triggered event, such as at least partially based on play of a primary game.

In various embodiments, after qualification for a secondary game has been determined, the secondary game participation may be enhanced through continued play on the primary game. Thus, in certain embodiments, for each secondary game qualifying event, such as a secondary game symbol, that is obtained, a given number of secondary game wagering points or credits is accumulated in a "secondary game meter" configured to accrue the secondary game wagering credits or entries toward eventual participation in the secondary game. In one such embodiment, the occurrence of multiple such secondary game qualifying events in the primary game results in an arithmetic or exponential increase in the number of secondary game wagering credits awarded. In another such embodiment, any extra secondary game wagering credits may be redeemed during the secondary game to extend play of the secondary game.

In certain embodiments, no separate entry fee or buy-in for the secondary game is required. That is, entry into the secondary game cannot be purchased; rather, in these embodiments entry must be won or earned through play of the primary game, thereby encouraging play of the primary game. In other embodiments, qualification for the secondary game is accomplished through a simple "buy-in." For example, qualification through other specified activities is unsuccessful, payment of a fee or placement of an additional wager "buys-in" to the secondary game. In certain embodiments, a separate side wager must be placed on the secondary game or a wager of a designated amount must be placed on the primary game to enable qualification for the secondary game. In these embodiments, the secondary game triggering event must occur and the side wager (or designated primary game wager amount) must have been placed for the secondary game to trigger.

In various embodiments in which the gaming system includes a plurality of EGMs, the EGMs are configured to communicate with one another to provide a group gaming environment. In certain such embodiments, the EGMs enable players of those EGMs to work in conjunction with one another, such as by enabling the players to play together as a team or group, to win one or more awards. In other such embodiments, the EGMs enable players of those EGMs to compete against one another for one or more awards. In one such embodiment, the EGMs enable the players of those EGMs to participate in one or more gaming tournaments for one or more awards. At least U.S. Patent Application Publication Nos. 2007/0123341, 2008/0070680, 2008/0176650, and 2009/0124363 describe various examples of different group gaming systems.

In various embodiments, the gaming system includes one or more player tracking systems. Such player tracking systems enable operators of the gaming system (such as casinos or other gaming establishments) to recognize the value of customer loyalty by identifying frequent customers and rewarding them for their patronage. Such a player tracking system is configured to track a player's gaming activity. In one such embodiment, the player tracking system does so through the use of player tracking cards. In this embodiment, a player is issued a player identification card that has an encoded player identification number that uniquely identifies the player. When the player's playing tracking card is inserted into a card reader of the gaming system to begin a gaming session, the card reader reads the player identification number off the player tracking card to identify the player. The gaming system timely tracks any suitable information or data relating to the identified player's gaming session. The gaming system also timely tracks when the player tracking card is removed to conclude play for that gaming session. In another embodiment, rather than requiring insertion of a player tracking card into the card reader, the gaming system utilizes one or more portable devices, such as a cell phone, a radio frequency identification tag, or any other suitable wireless device, to track when a gaming session begins and ends. In another embodiment, the gaming system utilizes any suitable biometric technology or ticket technology to track when a gaming session begins and ends.

In such embodiments, during one or more gaming sessions, the gaming system tracks any suitable information or data, such as any amounts wagered, average wager amounts, and/or the time at which these wagers are placed. In different embodiments, for one or more players, the player tracking system includes the player's account number, the player's card number, the player's first name, the player's surname, the player's preferred name, the player's player tracking ranking, any promotion status associated with the player's player tracking card, the player's address, the player's birthday, the player's anniversary, the player's recent gaming sessions, or any other suitable data. In various embodiments, such tracked information and/or any suitable feature associated with the player tracking system is displayed on a player tracking display. In various embodiments, such tracked information and/or any suitable feature associated with the player tracking system is displayed via one or more service windows that are displayed on the central display device and/or the upper display device. At least U.S. Pat. Nos. 6,722,985; 6,908,387; 7,311,605; 7,611,411; 7,617,151; and 8,057,298 describe various examples of player tracking systems.

It should be understood that various changes and modifications to the present embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A gaming system comprising:
   a housing;
   at least one processor;
   at least one display device supported by the housing;
   a plurality of input devices supported by the housing and including an acceptor; and
   at least one memory device that stores a plurality of instructions which, when executed by the at least one processor, cause the at least one processor to operate with the at least one display device and the plurality of input devices to:
   (a) establish a credit balance based at least in part on a monetary value associated with a physical item following receipt of the physical item by the acceptor;
   (b) place a wager following receipt of an actuation of a wager button, the credit balance decreasable by the wager;
   (c) display a first set of one or more selections, each selection of the first set being associated with one of a plurality of different activatable selection game enhancements;
   (d) display a different second set of one or more selections, at least one selection of the second set being associated with one of a plurality of different awards, wherein each activatable selection game enhancement is associated with one or more of the plurality of different awards;
   (e) provide a player with an initial quantity of at least two picks;
   (f) enable the player to use one of the picks to pick one of the displayed selections of the first set or one of the displayed selections of the second set and reduce the player's quantity of picks after receiving a pick of one of the displayed selections;
   (g) if the picked selection is one of the one or more selections of the first set, activate the selection game enhancement associated with the picked selection and display an indication of the active selection game enhancement;
   (h) if the picked selection is one of the one or more selections of the second set:
      (i) if any active selection game enhancements are associated with the award associated with said picked selection, modify the award associated with said picked selection in accordance with said active selection game enhancements and display the modified award, the credit balance increasable by the modified award; and
      (ii) if no active selection game enhancements are associated with the award associated with said picked selection, display the award associated with the picked selection, the credit balance increasable by the award;
   (i) repeat (g) to (h) if the player has at least one pick remaining; and
   (j) initiate a payout associated with the credit balance following receipt of an actuation of a cashout button.

2. The gaming system of claim 1, wherein the plurality of instructions, when executed by the at least one processor, cause the at least one processor to, if the picked selection is one of the one or more selections of the first set, activate the selection game enhancement associated with the picked selection without providing any awards.

3. The gaming system of claim 1, wherein each of the plurality of different awards has one of a plurality of different characteristics.

4. The gaming system of claim 3, wherein, for each activatable selection game enhancement:
   (a) said activatable selection game enhancement is associated with one or more of the plurality of different characteristics; and
   (b) each award with which said activatable selection game enhancement is associated has at least one of the one or more characteristics with which said activatable selection game enhancement is associated.

5. The gaming system of claim 1, wherein the initial quantity is greater than a quantity of selections in the second set.

6. The gaming system of claim 1, wherein the plurality of instructions, when executed by the at least one processor, cause the at least one processor to not enable the player to pick at least one of the displayed one or more selections of the second set until a designated selection game enhancement is activated.

7. The gaming system of claim 1, which includes: (1) a player tracking device including a player tracking card reader configured to receive and read a player tracking card to facilitate storing tracked game play data with a player associated with that player tracking card, and (2) a ticket printer configured to print a ticket associated with a value representative of the credit balance following receipt of the actuation of the cashout button.

8. A method of operating a gaming system, said method comprising:
   (a) receiving, by an acceptor, a physical item associated with a monetary value;
   (b) establishing, by at least one processor, a credit balance based at least in part on the monetary value associated with the received physical item;
   (c) receiving an actuation of a wager button;
   (d) placing, by the at least one processor, a wager responsive to the actuation of the wager button, the credit balance decreasable by the wager;
   (e) displaying, by at least one display device, a first set of one or more selections, each selection of the first set being associated with one of a plurality of different activatable selection game enhancements;
   (f) displaying, by the at least one display device, a different second set of one or more selections, at least one selection of the second set being associated with one of a plurality of different awards, wherein each activatable selection game enhancement is associated with one or more of the plurality of different awards;
   (g) providing a player with an initial quantity of at least two picks;
   (h) enabling the player to use one of the picks to pick one of the displayed selections of the first set or one of the displayed selections of the second set and receiving, by at least one input device, a pick of one of the displayed selections;
   (i) reducing, by the at least one processor, the player's quantity of picks;
   (j) if the picked selection is one of the one or more selections of the first set, activating, by the at least one processor, the selection game enhancement associated with the picked selection and displaying, by the at least one display device, an indication of the active selection game enhancement;
   (k) if the picked selection is one of the one or more selections of the second set:
      (i) if any active selection game enhancements are associated with the award associated with said picked selection, modifying, by the at least one processor, the award associated with said picked selection in accordance with said active selection game enhancements and displaying, by the at least one display device, the modified award, the credit balance increasable by the modified award; and (ii) if no active selection game enhancements are associated with the award associated with said picked selection, displaying, by the at least one display device, the award associated with the picked selection, the credit balance increasable by the award;

(l) repeating (h) to (k) if the player has at least one pick remaining;

(m) receiving an actuation of a cashout button; and (n) initiating, by the at least one processor, a payout associated with the credit balance responsive to the actuation of the cashout button.

9. The method of claim 8, which includes, if the picked selection is one of the one or more selections of the first set, activating, by the at least one processor, the selection game enhancement associated with the picked selection without providing any awards.

10. The method of claim 9, wherein, for each activatable selection game enhancement:

(a) said activatable selection game enhancement is associated with one or more of the plurality of different characteristics; and (b) each award with which said activatable selection game enhancement is associated has at least one of the one or more characteristics with which said activatable selection game enhancement is associated.

11. The method of claim 8, wherein each of the plurality of different awards has one of a plurality of different characteristics.

12. The method of claim 8, wherein the initial quantity is greater than a quantity of selections in the second set.

13. The method of claim 8, which includes not enabling the player to pick at least one of the displayed one or more selections of the second set until a designated selection game enhancement is activated.

14. The method of claim 8, which is provided through a data network.

15. The method of claim 14, wherein the data network is an internet.

16. The method of claim 8, which includes: (1) receiving, by a player tracking card reader of a player tracking device, a player tracking card; (2) reading, by the player tracking card reader, the received player tracking card to facilitate storing tracked game play data with a player associated with that player tracking card; and (3) printing, by a ticket printer, a ticket associated with a value representative of the credit balance responsive to the received actuation of the cashout button.

17. A non-transitory computer readable medium that stores a plurality of instructions which, when executed by at least one processor, cause the at least one processor to:

(a) establish a credit balance based at least in part on a monetary value associated with a physical item following receipt of the physical item by the acceptor;

(b) place a wager following receipt of an actuation of a wager button, the credit balance decreasable by the wager;

(c) cause at least one display device to display a first set of one or more selections, each selection of the first set being associated with one of a plurality of different activatable selection game enhancements;

(d) cause the at least one display device to display a different second set of one or more selections, at least one selection of the second set being associated with one of a plurality of different awards, wherein each activatable selection game enhancement is associated with one or more of the plurality of different awards;

(e) provide a player with an initial quantity of at least two picks;

(f) enable the player to use one of the picks to pick one of the displayed selections of the first set or one of the displayed selections of the second set and reduce the player's quantity of picks after receiving a pick of one of the displayed selections;

(g) if the picked selection is one of the one or more selections of the first set, activate the selection game enhancement associated with the picked selection and cause the at least one display device to display an indication of the active selection game enhancement;

(h) if the picked selection is one of the one or more selections of the second set:

(i) if any active selection game enhancements are associated with the award associated with said picked selection, modify the award associated with said picked selection in accordance with said active selection game enhancements and display the modified award; and (ii) if no active selection game enhancements are associated with the award associated with said picked selection, cause the at least one display device to display the award associated with the picked selection;

(i) repeat (f) to (h) if the player has at least one pick remaining; and (j) initiate a payout associated with the credit balance following receipt of an actuation of a cashout button.

18. The non-transitory computer readable medium of claim 17, wherein the plurality of instructions, when executed by the at least one processor, cause the at least one processor to, if the picked selection is one of the one or more selections of the first set, activate the selection game enhancement associated with the picked selection without providing any awards.

19. The non-transitory computer readable medium of claim 17, wherein each of the plurality of different awards has one of a plurality of different characteristics.

20. The non-transitory computer readable medium of claim 19, wherein, for each activatable selection game enhancement:

(a) said activatable selection game enhancement is associated with one or more of the plurality of different characteristics; and (b) each award with which said activatable selection game enhancement is associated has at least one of the one or more characteristics with which said activatable selection game enhancement is associated.

21. The non-transitory computer readable medium of claim 17, wherein the initial quantity is greater than a quantity of selections in the second set.

22. The non-transitory computer readable medium of claim 17, wherein the plurality of instructions, when executed by the at least one processor, cause the at least one processor to not enable the player to pick at least one of the displayed one or more selections of the second set until a designated selection game enhancement is activated.

23. The non-transitory computer readable medium of claim 17, wherein the plurality of instructions, when executed by the at least one processor, cause the at least one processor to: (1) cause a player tracking card reader of a player tracking device to read a player tracking card received by the player tracking card reader to facilitate storing tracked game play data with a player associated with that player tracking card, and (2) cause a ticket printer to print a ticket associated with a value representative of the credit balance following receipt of the actuation of the cashout button.

* * * * *